(12) United States Patent
Zhang et al.

(10) Patent No.: US 11,115,676 B2
(45) Date of Patent: Sep. 7, 2021

(54) INTERACTION BETWEEN INTRA BLOCK COPY MODE AND INTER PREDICTION TOOLS

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/167,266

(22) Filed: Feb. 4, 2021

(65) Prior Publication Data

US 2021/0160533 A1 May 27, 2021

Related U.S. Application Data

(63) Continuation of application No. PCT/CN2019/122183, filed on Nov. 29, 2019.

(30) Foreign Application Priority Data

Nov. 29, 2018 (WO) ................ PCT/CN2018/118167

(51) Int. Cl.
*H04N 19/52* (2014.01)
*H04N 19/159* (2014.01)
(Continued)

(52) U.S. Cl.
CPC ........... *H04N 19/52* (2014.11); *H04N 19/159* (2014.11); *H04N 19/176* (2014.11);
(Continued)

(58) Field of Classification Search
CPC .... H04N 19/52; H04N 19/184; H04N 19/159; H04N 19/176
See application file for complete search history.

(56) References Cited

U.S. PATENT DOCUMENTS 9,591,325 B2 3/2017 Li et al.
9,883,197 B2 1/2018 Chen et al.
(Continued)

FOREIGN PATENT DOCUMENTS

CN 105392008 A 3/2016
CN 106416253 A 2/2017
(Continued)

OTHER PUBLICATIONS

Chen et al. "Generalized Bi-Prediction for Inter Coding," Joint Video Exploration Team (JVET) of ITU-T SG 16 WP 3 and ISO-IEC JTC 1/SC 29/WG 11, 3rd Meeting, Geneva, CH, May 26 to Jun. 1, 2016, document JVET-C0047, 2016.
(Continued)

*Primary Examiner* — Nam D Pham
(74) *Attorney, Agent, or Firm* — Perkins Coie LLP

(57) ABSTRACT

The present disclosure relate to interaction between intra block copy mode and inter prediction tools A method for video processing is provided, including: determining that an Intra-Block-Copy (IBC) mode is applied to a current video block of a video, wherein in the IBC mode, at least one reference picture used by the current video block is a current picture where the current video block is located in; making a decision regarding a disabling of a specific coding mode for the current block; performing, based on the decision, a conversion between the current video block and the bitstream representation; wherein the specific coding mode uses a motion vector and a non-current picture to derive a prediction of a video block.

19 Claims, 41 Drawing Sheets

(51) Int. Cl.
  *H04N 19/176* (2014.01)
  *H04N 19/184* (2014.01)
  *H04N 19/51* (2014.01)
  *H04N 19/593* (2014.01)
(52) U.S. Cl.
  CPC .......... *H04N 19/184* (2014.11); *H04N 19/51* (2014.11); *H04N 19/593* (2014.11)

(56) References Cited

U.S. PATENT DOCUMENTS

| | | | |
|---|---|---|---|
| 9,918,105 | B2 | 3/2018 | Pang et al. |
| 10,178,403 | B2 | 1/2019 | Seregin et al. |
| 10,264,290 | B2 | 4/2019 | Xu et al. |
| 10,484,686 | B2 | 11/2019 | Xiu et al. |
| 10,638,140 | B2 | 4/2020 | Seregin et al. |
| 2015/0085929 | A1 | 3/2015 | Chen et al. |
| 2015/0139296 | A1 | 5/2015 | Yu et al. |
| 2015/0264396 | A1 | 9/2015 | Zhang et al. |
| 2015/0373359 | A1 | 12/2015 | He et al. |
| 2016/0100189 | A1 | 4/2016 | Pang et al. |
| 2016/0241852 | A1* | 8/2016 | Gamei ................. H04N 19/159 |
| 2016/0241858 | A1 | 8/2016 | Li et al. |
| 2016/0241876 | A1 | 8/2016 | Xu et al. |
| 2016/0353117 | A1 | 12/2016 | Seregin et al. |
| 2017/0034526 | A1* | 2/2017 | Rapaka ................. H04N 19/593 |
| 2017/0099490 | A1 | 4/2017 | Seregin et al. |
| 2017/0332095 | A1 | 11/2017 | Zou et al. |
| 2018/0192069 | A1 | 7/2018 | Chen et al. |
| 2018/0288430 | A1 | 10/2018 | Chen et al. |
| 2018/0376149 | A1* | 12/2018 | Zhang .................. H04N 19/503 |
| 2019/0246128 | A1* | 8/2019 | Xu ....................... H04N 19/159 |
| 2020/0036997 | A1 | 1/2020 | Li et al. |
| 2020/0177910 | A1 | 1/2020 | Li et al. |
| 2020/0195959 | A1 | 6/2020 | Zhang et al. |
| 2020/0396465 | A1 | 12/2020 | Zhang et al. |

FOREIGN PATENT DOCUMENTS

| | | |
|---|---|---|
| CN | 107079161 A | 8/2017 |
| CN | 107852490 A | 3/2018 |
| CN | 108702509 A | 10/2018 |
| KR | 20160059513 A | 5/2016 |
| WO | 2016123068 A1 | 8/2016 |
| WO | 2016123081 A1 | 8/2016 |
| WO | 2017118409 A1 | 7/2017 |
| WO | 2017157259 A1 | 9/2017 |
| WO | 2018192574 A1 | 10/2018 |
| WO | 2018200960 A1 | 11/2018 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "CE4: Affine Merge Enhancement with Simplification (Test 4.2.2)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0368, 2018.

Chen et al. "Crosscheck of JVET-L0142 (CE4: Simplification of the Common Base for Affine Merge (Test 4.2.6))," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0632, 2018.

Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0100, 2018.

"JEM-7.0: https://jvet.hhi.fraunhofer.de/svn/svn_HMJEMSoftware/tags/HM-16.6-JEM-7.0.".

He et al. "CE4-Related: Encoder Speed-Up and Bug Fix for Generalized Bi-Prediction in BMS-2.1," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0296, 2018.

Huang et al. "CE4.2.5: Simplification of Affine Merge List Construction and Move ATMVP to Affine Merge List," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0278, 2018.

"High Efficiency Video Coding" Series H: Audiovisual and Multimedia Systems: Infrastructure of Audiovisual Services—Coding of Moving Video, ITU-T, H.265, 2018.

Li et al. "Non-SCCE1: Unification of Intra BC and Inter Modes," Joint Collaborative Team on Video Coding (JCT-VC) of ITU-T SG 16 WP 3 and ISO/IEC JTC 1/SC 29/WG 11 18th Meeting, Sapporo, JP, Jun. 30-Jul. 9, 2014, document JCTVC-R0100, 2014.

Lee et al. "CE4: Simplification of the Common Base for Affine Merge (Test 4.2.2)," Joint Video Experts Team (JVET) of ITU-T SG 16 WP 3 and ISO/IEC JTC 1/SC 29/WG 11, 12th Meeting, Macau, CN, Oct. 8-12, 2012, document JVET-L0142, 2018.

Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2019, document JCTVC-Y1002, 2016.

Su et al. "CE4-Related: Generalized Bi-Prediction Improvements Combined from JVET-L0197 and JVET-L0296," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0646, 2018.

Su et al. "CE4.4.1: Generalized Bi-Prediction for Intercoding," Joint Video Exploration Team of ISO/IEC JTC 1/SC 29/WG 11 and ITU-T SG 16, Ljubljana, Jul. 10-18, 2018, document No. JVET-K0248, 2018.

Su et al. "CE4-Related: Generalized Bi-Prediction Improvements," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0197, 2018.

International Search Report and Written Opinion from International Patent Application No. PCT/CN2019/122183 dated Feb. 28, 2020 (13 pages).

International Search Report and Written Opinion from International Patent Application No. PCT/CN2019/122194 dated Mar. 6, 2020 (10 pages).

International Search Report and Written Opinion from International Patent Application No. PCT/CN2019/122195 dated Mar. 2, 2020 (10 pages).

International Search Report and Written Opinion from International Patent Application No. PCT/CN2019/122198 dated Feb. 28, 2020 (11 pages).

Non-Final Office Action from U.S. Appl. No. 17/167,303 dated Apr. 1, 2021.

* cited by examiner

2910 — Determining that an Intra-Block-Copy (IBC) mode is applied to a current video block of a video, wherein in the IBC mode, at least one reference picture used by the current video block is a current picture where the current video block is located in 2920 — Making a decision regarding a disabling of a specific coding mode for the current block, wherein the specific coding mode uses a motion vector and a non-current picture to derive a prediction of a video block 2930 — Performing, based on the decision, a conversion between the current video block and the bitstream representation

Performing a conversion between a current video block of a video and a bitstream representation of the video current block, wherein during the conversion an Intra-Block-Copy (IBC) mode and a merge with motion vector difference (MMVD) mode are used, and wherein in the IBC mode, at least one reference picture used by the current video block is a current picture in which the current video block is located in, and in the MMVD mode, a motion vector of a video block is derived based on a merge motion candidate list and is further refined by at least one motion vector difference

Performing a conversion between a current video block of a video and a bitstream representation of the video, wherein during the conversion an Intra-Block-Copy (IBC) mode and an inter-intra prediction mode are used, and wherein in the IBC mode, at least one reference picture used by the current video block is a current picture in which the current video block is located in, and in the inter-intra prediction mode, prediction signal of the current video block is generated at least based on an intra prediction signal and an inter prediction signal

FIG. 33

INTERACTION BETWEEN INTRA BLOCK COPY MODE AND INTER PREDICTION TOOLS

CROSS REFERENCE

This application is a continuation of International Patent Application No. PCT/CN2019/122183, filed on Nov. 29, 2019, which claims the priority to and benefits of International Patent Application No. PCT/CN2018/118167, filed on Nov. 29, 2018. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to motion vector derivation and signaling for Intra-Block-Copy (IBC) in video and image coding are described. The described methods may be applied to both the existing video coding standards (e.g., High Efficiency Video Coding (HEVC)) and future video coding standards or video codecs.

In one representative aspect, the disclosed technology may be used to provide a method for video processing. This method includes determining that an Intra-Block-Copy (IBC) mode is applied to a current video block of a video, wherein in the IBC mode, at least one reference picture used by the current video block is a current picture where the current video block is located in; making a decision regarding a disabling of a specific coding mode for the current block; performing, based on the decision, a conversion between the current video block and the bitstream representation, wherein the specific coding mode uses a motion vector and a non-current picture to derive a prediction of a video block.

In another representative aspect, the disclosed technology may be used to provide a method for video processing. This method includes determining that a current video block is coded using a specific coding mode; making a decision regarding disabling of an Intra-Block-Copy (IBC) mode for the current block based on the determination, wherein in the IBC mode, at least one reference picture used by the current video block is a current picture where the current block is located in; performing, based on the decision, a conversion between the current block and the bitstream representation, wherein the specific coding mode uses a motion vector and a non-current picture to derive a prediction of the current block.

In yet another representative aspect, the disclosed technology may be used to provide a method for video processing. This method includes determining an affine mode of a current video block, wherein whether the current video block inherits an affine mode from a neighbouring block depends on a reference list; performing a conversion between a current video block of a video and a bitstream representation of the video consistent based on the determination.

In yet another representative aspect, the disclosed technology may be used to provide a method for video processing. This method includes performing a conversion between a current video block of a video and a bitstream representation of the video consistent, wherein during the conversion an Intra-Block-Copy (IBC) mode and a merge with motion vector difference (MMVD) mode are used, and wherein in the IBC mode, at least one reference picture used by the current video block is a current picture in which the current video block is located in, and in the MMVD mode, a motion vector of a video block is derived based on a merge motion candidate list and is further refined by at least one motion vector difference.

In yet another representative aspect, the disclosed technology may be used to provide a method for video processing. This method includes performing a conversion between a current video block of a video and a bitstream representation of the video, wherein during the conversion an Intra-Block-Copy (IBC) mode and an inter-intra prediction mode are used, and wherein in the IBC mode, at least one reference picture used by the current video block is a current picture in which the current video block is located in, and in the inter-intra prediction mode, prediction signal of the current video block is generated at least based on an intra prediction signal and an inter prediction signal.

In yet another representative aspect, the disclosed technology may be used to provide a method for video processing. This method includes determining, during a conversion between a current video block and a bitstream representation of the current video block, decoded information of at least one coding method different from an IBC mode, wherein in the IBC mode, at least one reference picture used by the current video block is a current picture in which the current video block is located in; determining, based on the decoded information, whether to skip signaling of an IBC flag for the current video block in a bitstream representation of the current video block, wherein the IBC flag relates with the IB mode; and performing the conversion based on the determining.

In yet another representative aspect, the disclosed technology may be used to provide a method for video processing. This method includes during a conversion between a current video block and a bitstream representation of the current video block, wherein the current video block comprises a luma component that is coded using a first coding structure tree and a chroma component that is coded using a second coding structure tree different from the first coding structure tree, deriving first motion vector information for a chroma block from second motion vector information of one or more corresponding blocks of the luma component of the current video block; performing the conversion based on the first motion vector information and the second vector information.

In yet another representative aspect, the disclosed technology may be used to provide a method for video processing. This method includes determining whether an Intra Block Copy (IBC) mode, in which at least one reference picture used by the current video block is identical to a picture in which the current video block is located, is applied for the current video block; signaling whether the IBC mode is applied for the current video block; refraining from signaling flags for a group of prediction modes based on determining that the IBC mode is applied for the current video block; and performing the conversion for the current video block based on the application of the IBC mode.

In yet another representative aspect, the disclosed technology may be used to provide a method for video processing. This method includes parsing a bitstream to determining whether an Intra Block Copy (IBC) mode, in which at least one reference picture used by the current video block is identical to a picture in which the current video block is located, is applied for the current video block; performing the conversion for the current video block based on the application of the IBC mode, wherein flags for a group of prediction modes are excluded from the bitstream based on determining that the CPR is applied for the current video block.

In yet another representative aspect, the disclosed technology may be used to provide a method for video processing. This method includes in a process of acquiring motion information of a current video block, during a conversion between the current video block and a bitstream representation of the current video block, wherein the motion information of the current video block is based on at least one affine model of at least one neighboring block of the current video block; determining whether a neighboring block of the current video block uses an Intra-Block Copy (IBC) mode in which at least one reference picture used by the neighboring video block is identical to a picture in which the neighboring block is located; disabling, for the current video block, to derive an affine candidate from the neighboring block based on determining that the neighbouring block uses the IBC mode; and performing the conversion based on the motion information of the current video block.

In yet another representative aspect, the disclosed technology may be used to provide a method for video processing. This method includes splitting a current video block into sub-blocks, during a conversion between a current video block and a bitstream representation of the current video block based on subblock-based temporal motion vector prediction (SbTMVP) mode; identifying, based on motion information of a spatial neighboring block of the current video block, a corresponding block, for a sub-block, in a motion source picture with a temporal vector; generating, based on coded mode information of the corresponding block, a motion vector and a reference index of the sub-block from the corresponding block of the sub-block; performing the conversion based on the generated motion vector and reference index.

In yet another representative aspect, the disclosed technology may be used to provide a method for video processing. This method includes splitting a current video block into sub-blocks, during a conversion between a current video block and a bitstream representation of the current video block based on subblock-based temporal motion vector prediction (SbTMVP) mode; identifying, based on coded mode information of a spatial neighboring block of the current video block, a corresponding block, for a sub-block, in a motion source picture with a temporal vector; generating a motion vector and a reference index of the sub-block from the corresponding block of the sub-block; performing the conversion based on the generated motion vector and reference index.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 20 shows an example of intra-picture block copy.

FIG. 29 shows a flowchart of yet another example method for video processing.

FIG. 32 shows a flowchart of yet another example method for video processing.

FIG. 33 shows a flowchart of yet another example method for video processing.

DETAILED DESCRIPTION

Figure 1:
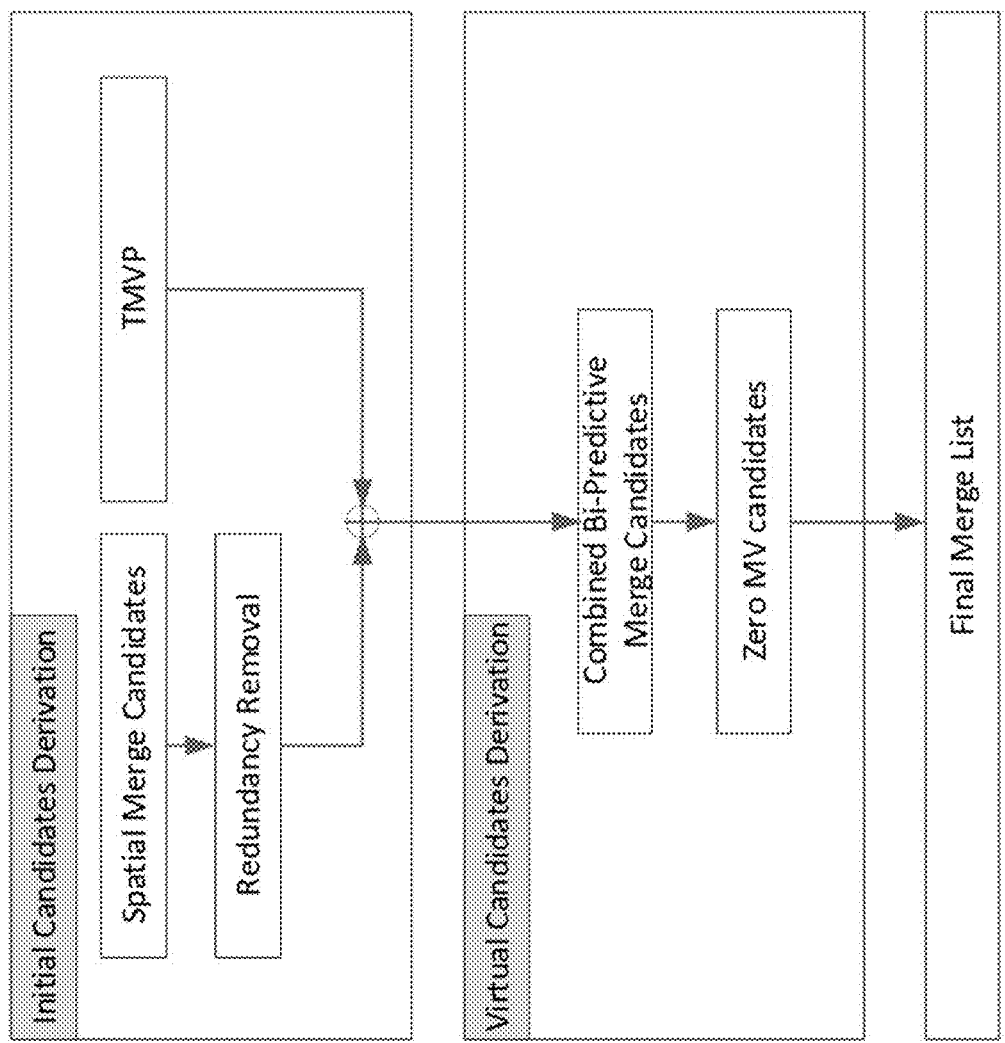
FIG. 1 shows an example of constructing a merge candidate list.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

In the present document, the term "video processing" may refer to video encoding, video decoding, video compression or video decompression. For example, video compression algorithms may be applied during conversion from pixel representation of a video to a corresponding bitstream representation or vice versa.

1 Examples of Inter-Prediction in HEVC/H.265

Video coding standards have significantly improved over the years, and now provide, in part, high coding efficiency and support for higher resolutions. Recent standards such as HEVC and H.265 are based on the hybrid video coding structure wherein temporal prediction plus transform coding are utilized.

1.1 Examples of Prediction Modes

Each inter-predicted PU (prediction unit) has motion parameters for one or two reference picture lists. In some embodiments, motion parameters include a motion vector and a reference picture index. In other embodiments, the usage of one of the two reference picture lists may also be signaled using inter_pred_idc. In yet other embodiments, motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector, corresponding reference picture index for each reference picture list and reference picture list usage are signaled explicitly per each PU.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference picture index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

1.1.1 Embodiments of Constructing Candidates for Merge Mode

When a PU is predicted using merge mode, an index pointing to an entry in the merge candidates list is parsed from the bitstream and used to retrieve the motion information. The construction of this list can be summarized according to the following sequence of steps:

Step 1: Initial candidates derivation
Step 1.1: Spatial candidates derivation
Step 1.2: Redundancy check for spatial candidates
Step 1.3: Temporal candidates derivation
Step 2: Additional candidates insertion
Step 2.1: Creation of bi-predictive candidates
Step 2.2: Insertion of zero motion candidates FIG. 1 shows an example of constructing a merge candidate list based on the sequence of steps summarized above.

For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates does not reach to maximum number of merge candidate (MaxNumMergeCand) which is signaled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

1.1.2 Constructing Spatial Merge Candidates

Figure 2:
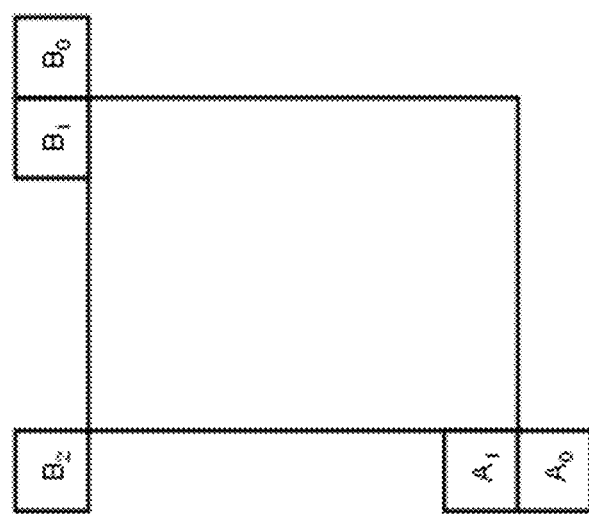
FIG. 2 shows an example of positions of spatial candidates.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved.

Figure 3:
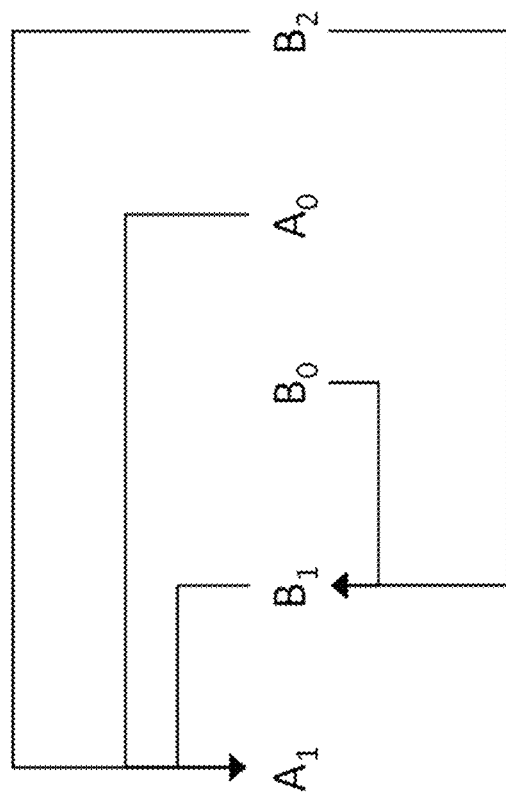
FIG. 3 shows an example of candidate pairs subject to a redundancy check of spatial merge candidates.
Figure 4B:
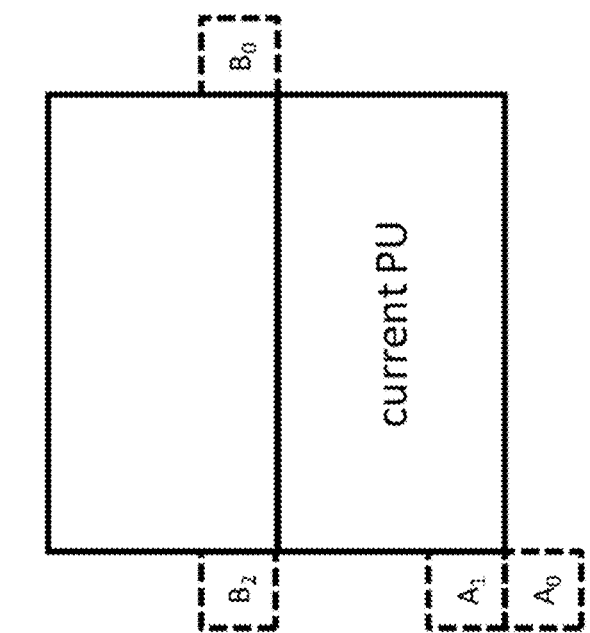
FIGS. 4A and 4B show examples of the position of a second prediction unit (PU) based on the size and shape of the current block.
Figure 4A:
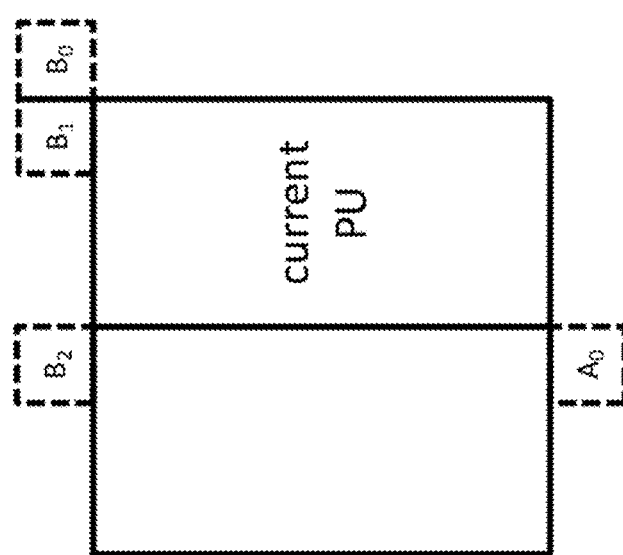

To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIGS. 4A and 4B depict the second PU for the case of N×2N and 2N×N, respectively. When the current PU is partitioned as N×2N, candidate at position $A_1$ is not considered for list construction. In some embodiments, adding this candidate may lead to two prediction units having the same motion information, which is redundant to just have one PU in a coding unit. Similarly, position $B_1$ is not considered when the current PU is partitioned as 2N×N.

1.1.3 Constructing Temporal Merge Candidates

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header.

Figure 5:
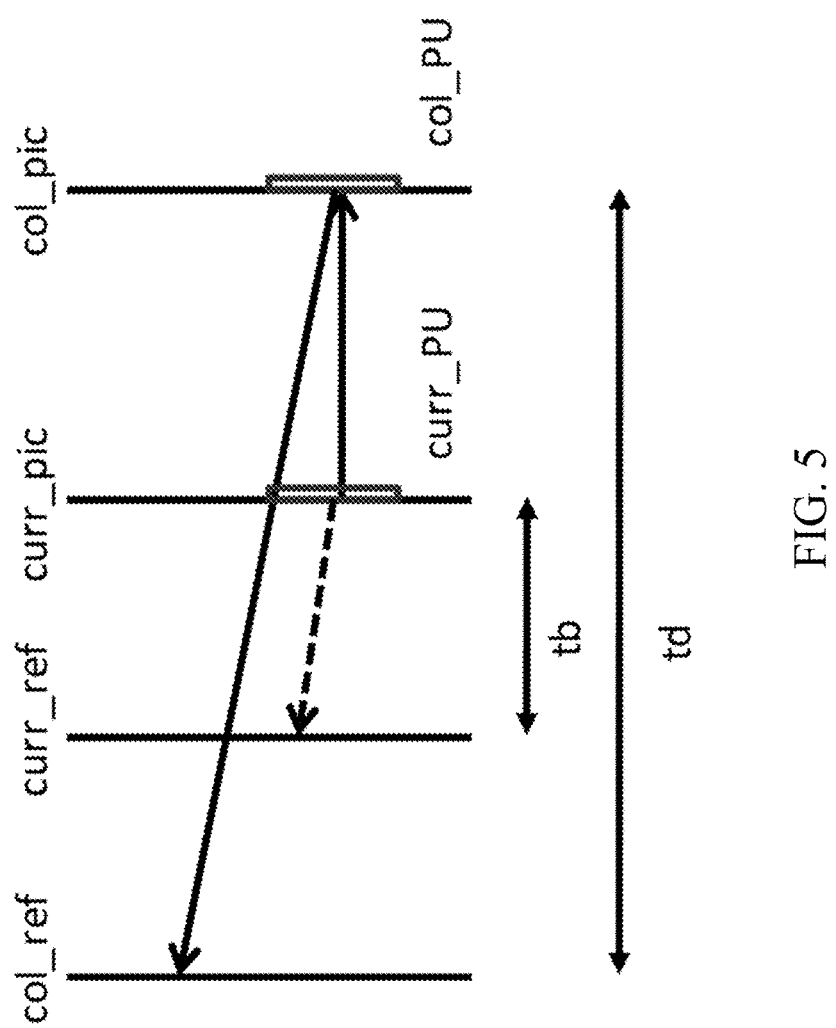
FIG. 5 shows an example of motion vector scaling for temporal merge candidates.

FIG. 5 shows an example of the derivation of the scaled motion vector for a temporal merge candidate (as the dotted line), which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. For a B-slice, two motion vectors, one is for reference picture list 0 and the other is for reference picture list 1, are obtained and combined to make the bi-predictive merge candidate.

Figure 6:
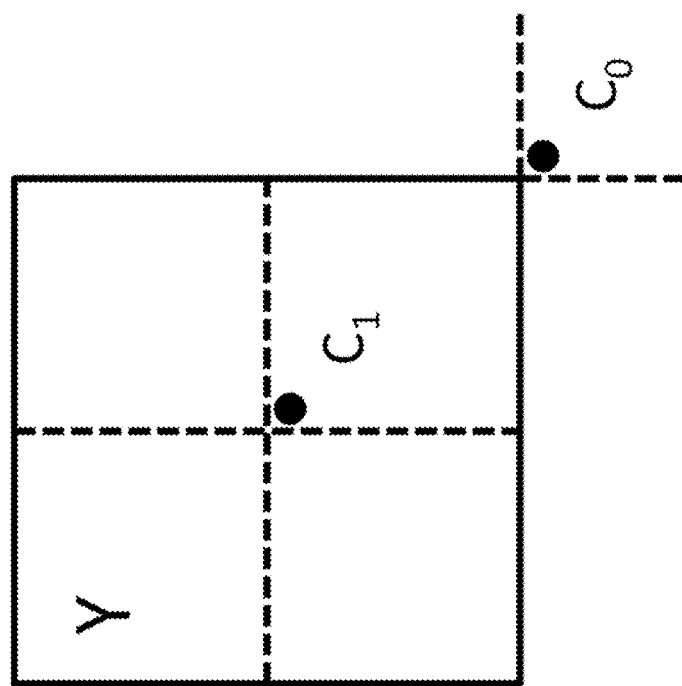
FIG. 6 shows an example of candidate positions for temporal merge candidates.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU, position $C_1$ is used. Otherwise, position $C_0$ is used in the derivation of the temporal merge candidate.

1.1.4 Constructing Additional Types of Merge Candidates

Besides spatio-temporal merge candidates, there are two additional types of merge candidates: combined bi-predictive merge candidate and zero merge candidate. Combined bi-predictive merge candidates are generated by utilizing spatio-temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate.

Figure 7:
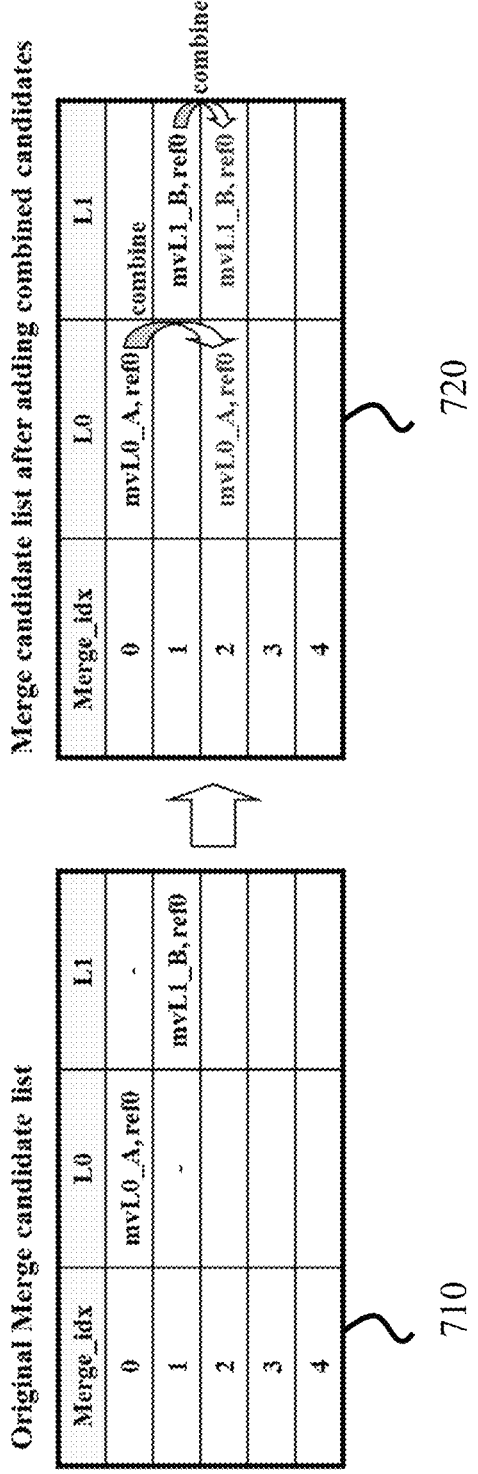
FIG. 7 shows an example of generating a combined bi-predictive merge candidate.

FIG. 7 shows an example of this process, wherein two candidates in the original list (710, on the left), which have mvL0 and refIdxL0 or mvL1 and refIdxL1, are used to create a combined bi-predictive merge candidate added to the final list (720, on the right).

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni- and bi-directional prediction, respectively. In some embodiments, no redundancy check is performed on these candidates.

In some embodiments, the following steps are performed in order till the merge list is full:
(1) Set variable numRef to either number of reference picture associated with list 0 for P slice, or the minimum number of reference pictures in two lists for B slice;
(2) Add non-repeated zero motion candidates:
For variable i being 0 . . . numRef−1, add a default motion candidate with MV set to (0, 0) and reference picture index set to i for list 0 (if P slice), or for both lists (if B slice).
(3) Add repeated zero motion candidates with MV set to (0, 0), reference picture index of list 0 set to 0 (if P slice) and reference picture indices of both lists set to 0 (if B slice).

1.2 Embodiments of Advanced Motion Vector Prediction (AMVP)

AMVP exploits spatio-temporal correlation of motion vector with neighboring PUs, which is used for explicit transmission of motion parameters. It constructs a motion vector candidate list by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly with merge index signaling, the index of the best motion vector candidate is encoded using truncated unary.

Figure 8:
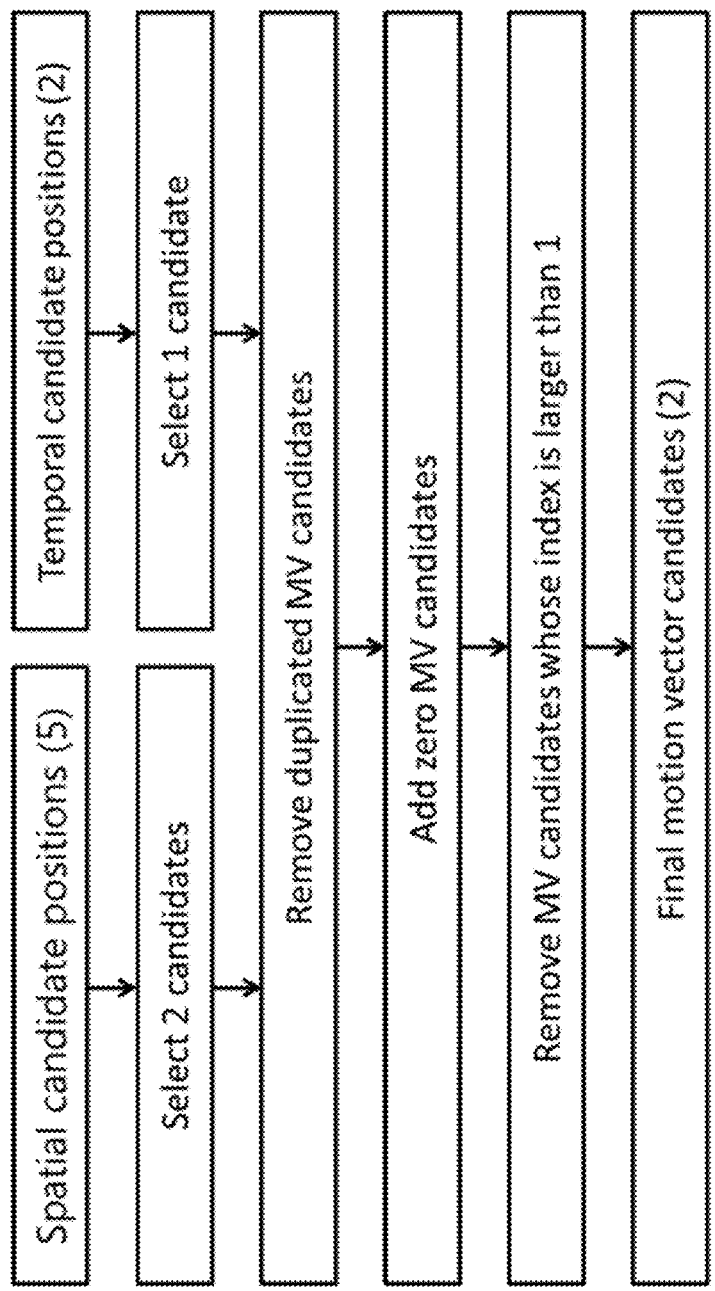
FIG. 8 shows an example of constructing motion vector prediction candidates.

The maximum value to be encoded in this case is 2 (see FIG. 8). In the following sections, details about derivation process of motion vector prediction candidate are provided.

1.2.1 Examples of Deriving AMVP Candidates

FIG. 8 summarizes derivation process for motion vector prediction candidate, and may be implemented for each reference picture list with refidx as an input.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as previously shown in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

1.2.2 Constructing Spatial Motion Vector Candidates

In the derivation of spatial motion vector candidates, a maximum of two candidates are considered among five potential candidates, which are derived from PUs located in positions as previously shown in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows:

No spatial scaling
 (1) Same reference picture list, and same reference picture index (same POC)
 (2) Different reference picture list, but same reference picture (same POC)
Spatial scaling
 (3) Same reference picture list, but different reference picture (different POC)
 (4) Different reference picture list, and different reference picture (different POC)

The no-spatial-scaling cases are checked first followed by the cases that allow spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
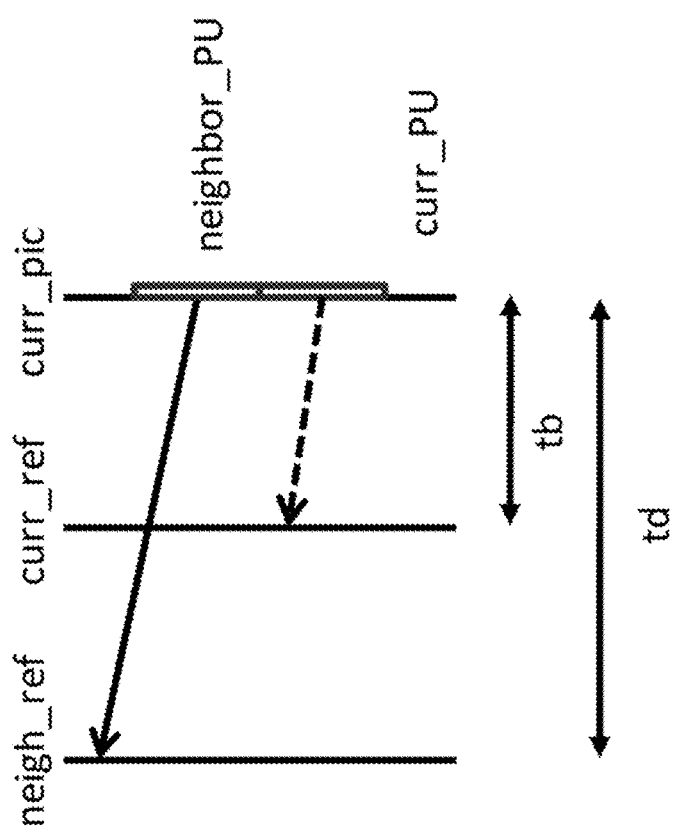
FIG. 9 shows an example of motion vector scaling for spatial motion vector candidates.

As shown in the example in FIG. 9, for the spatial scaling case, the motion vector of the neighboring PU is scaled in a similar manner as for temporal scaling. One difference is that the reference picture list and index of current PU is given as input; the actual scaling process is the same as that of temporal scaling.

1.2.3 Constructing Temporal Motion Vector Candidates

Apart from the reference picture index derivation, all processes for the derivation of temporal merge candidates are the same as for the derivation of spatial motion vector candidates (as shown in the example in FIG. 6). In some embodiments, the reference picture index is signaled to the decoder.

2 Example of Inter Prediction Methods in Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

2.1 Examples of Sub-CU Based Motion Vector Prediction

In the JEM with quadtrees plus binary trees (QTBT), each CU can have at most one set of motion parameters for each prediction direction. In some embodiments, two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector. In some embodiments, and to preserve more accurate motion field for sub-CU motion prediction, the motion compression for the reference frames may be disabled.

2.1.1 Examples of Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

Figure 10:
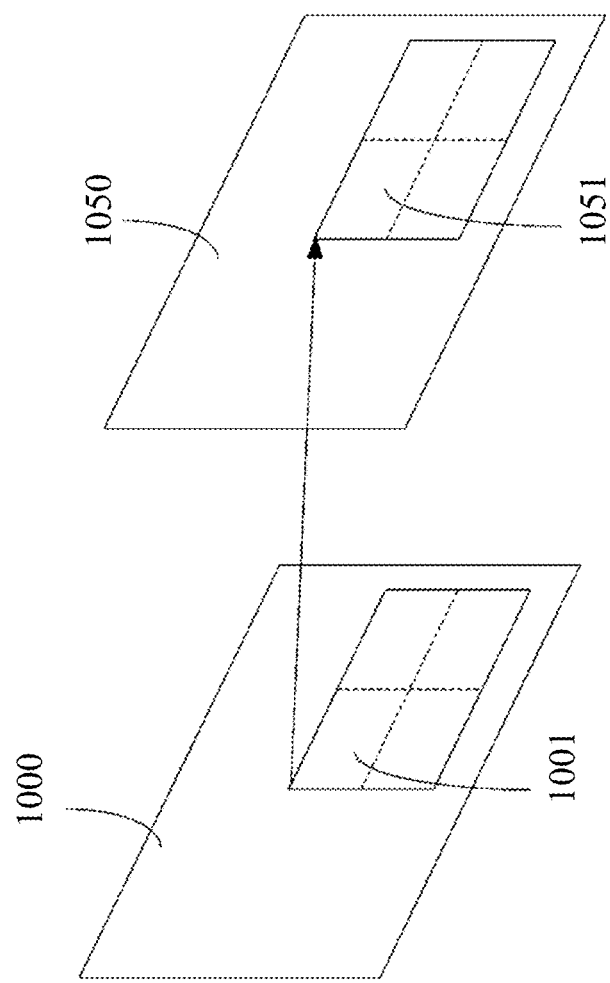
FIG. 10 shows an example of motion prediction using the alternative temporal motion vector prediction (ATMVP) algorithm for a coding unit (CU).

FIG. 10 shows an example of ATMVP motion prediction process for a CU 1000. The ATMVP method predicts the motion vectors of the sub-CUs 1001 within a CU 1000 in two steps. The first step is to identify the corresponding block 1051 in a reference picture 1050 with a temporal vector. The reference picture 1050 is also referred to as the motion source picture. The second step is to split the current CU 1000 into sub-CUs 1001 and obtain the motion vectors as well as the reference indices of each sub-CU from the block corresponding to each sub-CU.

In the first step, a reference picture 1050 and the corresponding block is determined by the motion information of the spatial neighboring blocks of the current CU 1000. To avoid the repetitive scanning process of neighboring blocks, the first merge candidate in the merge candidate list of the current CU 1000 is used. The first available motion vector as well as its associated reference picture index are set to be the temporal vector and the index to the motion source picture. This way, the corresponding block may be more accurately identified, compared with TMVP, wherein the corresponding block (sometimes called collocated block) is always in a bottom-right or center position relative to the current CU.

In the second step, a corresponding block of the sub-CU 1051 is identified by the temporal vector in the motion source picture 1050, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1−X) for each sub-CU.

2.1.2 Examples of Spatial-Temporal Motion Vector Prediction (STMVP)

Figure 11:
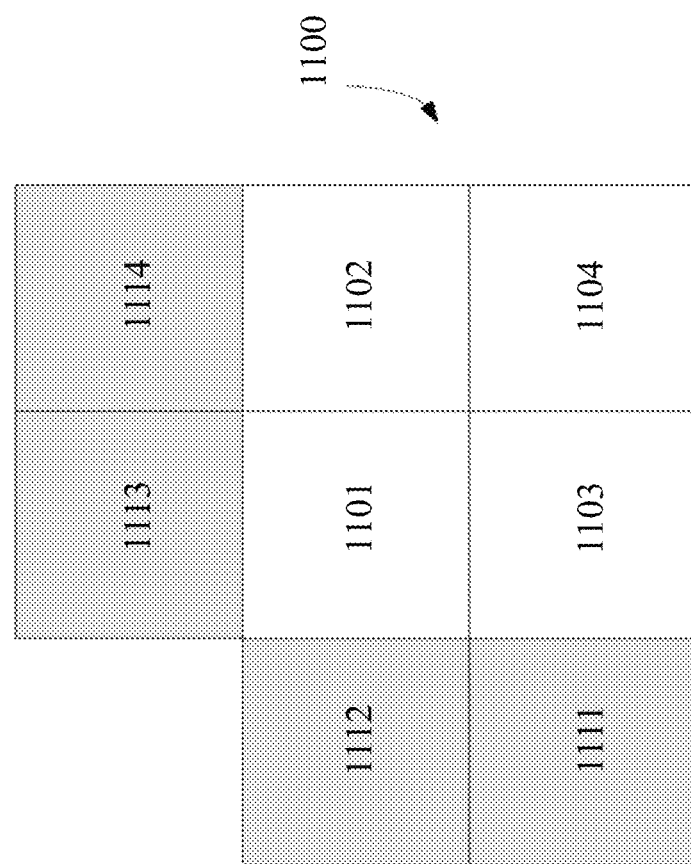
FIG. 11 shows an example of a coding unit (CU) with sub-blocks and neighboring blocks used by the spatial-temporal motion vector prediction (STMVP) algorithm.

In the STMVP method, the motion vectors of the sub-CUs are derived recursively, following raster scan order. FIG. 11 shows an example of one CU with four sub-blocks and neighboring blocks. Consider an 8×8 CU 1100 that includes four 4×4 sub-CUs A (1101), B (1102), C (1103), and D (1104). The neighboring 4×4 blocks in the current frame are labelled as a (1111), b (1112), c (1113), and d (1114).

The motion derivation for sub-CU A starts by identifying its two spatial neighbors. The first neighbor is the N×N block above sub-CU A 1101 (block c 1113). If this block c (1113) is not available or is intra coded the other N×N blocks above sub-CU A (1101) are checked (from left to right, starting at block c 1113). The second neighbor is a block to the left of the sub-CU A 1101 (block b 1112). If block b (1112) is not available or is intra coded other blocks to the left of sub-CU A 1101 are checked (from top to bottom, staring at block b 1112). The motion information obtained from the neighboring blocks for each list is scaled to the first reference frame for a given list. Next, temporal motion vector predictor (TMVP) of sub-block A 1101 is derived by following the same procedure of TMVP derivation as specified in HEVC. The motion information of the collocated block at block D 1104 is fetched and scaled accordingly. Finally, after retrieving and scaling the motion information, all available motion vectors are averaged separately for each reference list. The averaged motion vector is assigned as the motion vector of the current sub-CU.

2.1.3 Examples of Sub-CU Motion Prediction Mode Signaling

In some embodiments, the sub-CU modes are enabled as additional merge candidates and there is no additional syntax element required to signal the modes. Two additional merge candidates are added to merge candidates list of each CU to represent the ATMVP mode and STMVP mode. In other embodiments, up to seven merge candidates may be used, if the sequence parameter set indicates that ATMVP and STMVP are enabled. The encoding logic of the additional merge candidates is the same as for the merge candidates in the HM, which means, for each CU in P or B slice, two more RD checks may be needed for the two additional merge candidates. In some embodiments, e.g., JEM, all bins of the merge index are context coded by CABAC (Context-based Adaptive Binary Arithmetic Coding). In other embodiments, e.g., HEVC, only the first bin is context coded and the remaining bins are context by-pass coded.

2.2 Example of Inter Prediction Methods in VVC

There are several new coding tools for inter prediction improvement, such as Adaptive motion vector difference resolution (AMVR) for signaling MVD, affine prediction mode, Triangular prediction mode (TPM), ATMVP, Generalized Bi-Prediction (GBI), Bi-directional Optical flow (BIO).

2.2.1 Examples of Coding Block Structures in VVC

In VVC, a QuadTree/BinaryTree/MulitpleTree (QT/BT/TT) structure is adopted to divide a picture into square or rectangle blocks. Besides QT/BT/TT, separate tree (a.k.a. Dual coding tree) is also adopted in VVC for I-frames. With separate trees, the coding block structure are signaled separately for the luma and chroma components.

2.2.2 Examples of Adaptive Motion Vector Difference Resolution

In some embodiments, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM:

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

Figure 12:
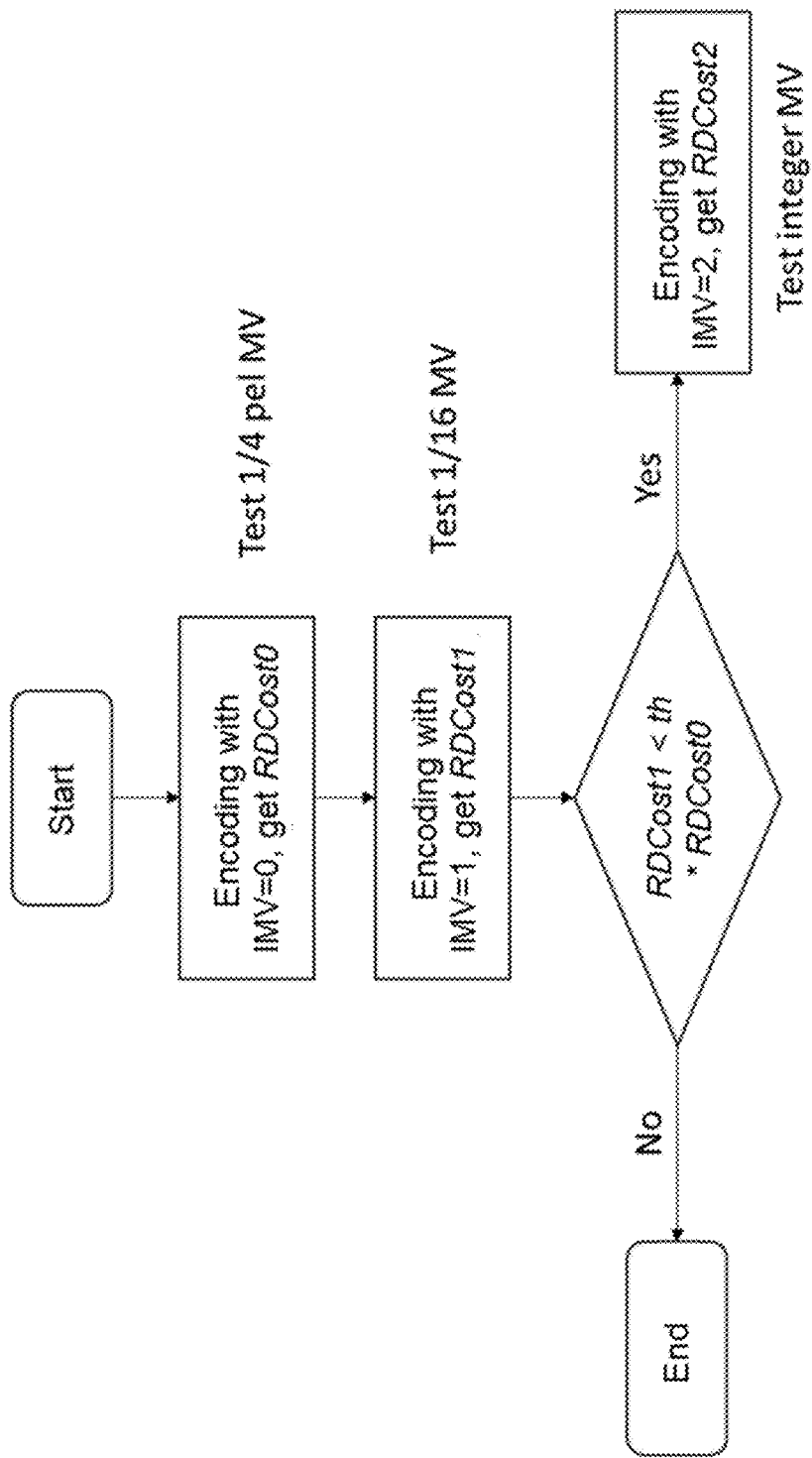
FIG. 12 shows an example flowchart for encoding with different MV precisions.

The encoding process is shown in FIG. 12. First, ¼ pel MV is tested and the RD cost is calculated and denoted as RDCost0, then integer MV is tested and the RD cost is denoted as RDCost1. If RDCost1<th*RDCost0 (wherein th is a positive valued threshold), then 4-pel MV is tested; otherwise, 4-pel MV is skipped. Basically, motion information and RD cost etc. are already known for ¼ pel MV when checking integer or 4-pel MV, which can be reused to speed up the encoding process of integer or 4-pel MV.

2.2.3 Examples of Affine Motion Compensation Prediction

Figure 13A:
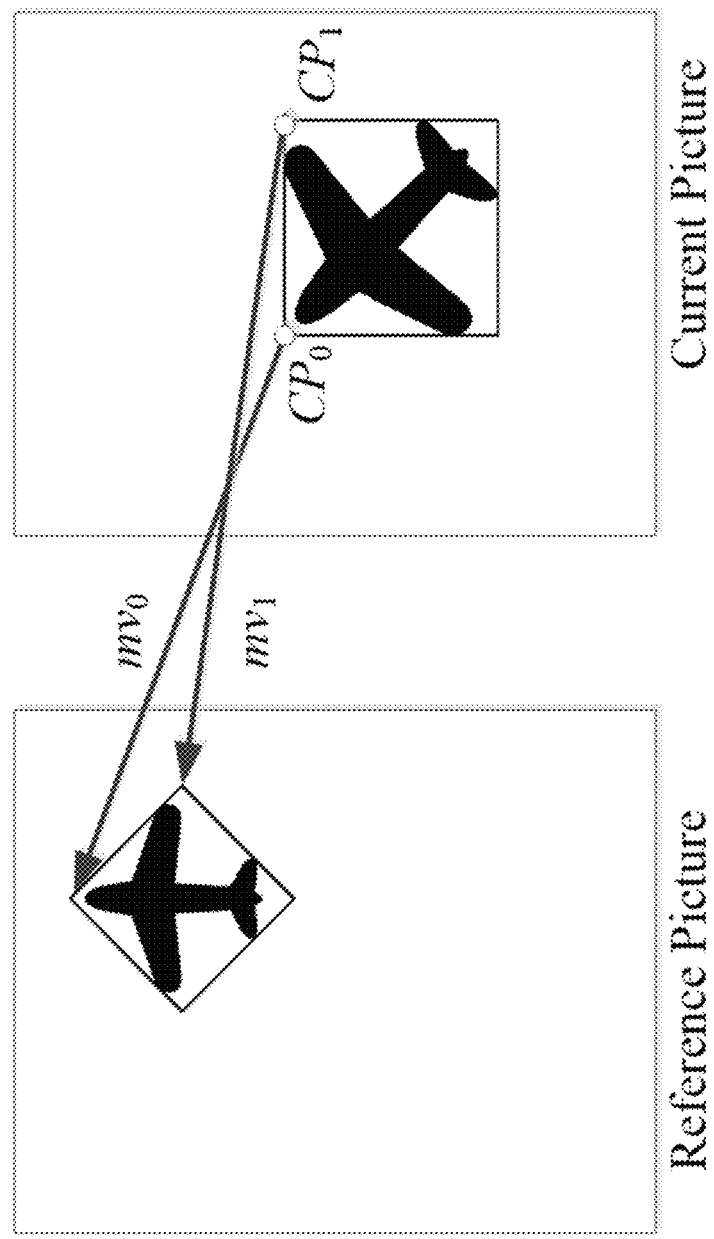
FIGS. 13A and 13B show examples of the simplified 4-parameter affine model and the simplified 6-parameter affine model, respectively.
Figure 13B:
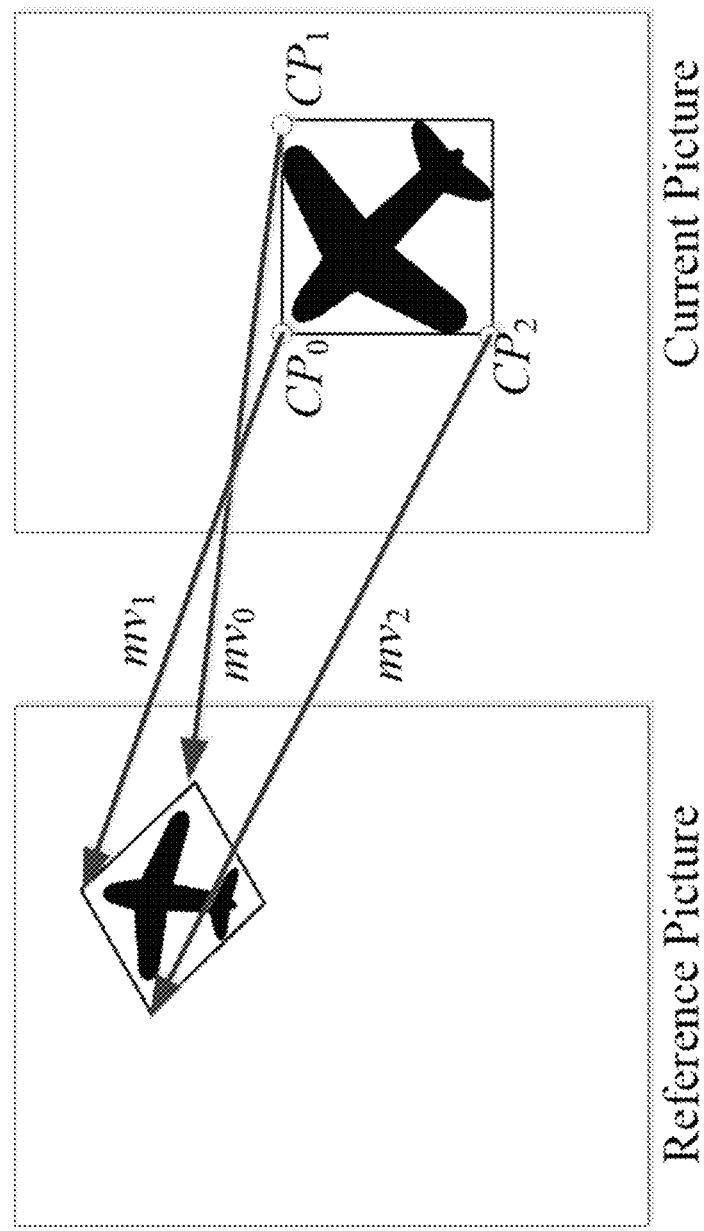

In HEVC, only a translation motion model is applied for motion compensation prediction (MCP). However, the camera and objects may have many kinds of motion, e.g. zoom in/out, rotation, perspective motions, and/or other irregular motions. In VVC, a simplified affine transform motion compensation prediction is applied with 4-parameter affine model and 6-parameter affine model. As shown in FIGS. 13A and 13B, the affine motion field of the block is described by two (in the 4-parameter affine model that uses the variables a, b, e and f) or three (in the 6-parameter affine model that uses the variables a, b, c, d, e and f) control point motion vectors, respectively.

The motion vector field (MVF) of a block is described by the following equation with the 4-parameter affine model and 6-parameter affine model respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad \text{Eq. (1)}$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad \text{Eq. (2)}$$

Herein, $(mv^h_0, mv^v_0)$ is motion vector of the top-left corner control point (CP), and $(mv^h_1, mv^v_1)$ is motion vector of the top-right corner control point and $(mv^h_2, mv^v_2)$ is motion vector of the bottom-left corner control point, (x, y) represents the coordinate of a representative point relative to the top-left sample within current block. The CP motion vectors may be signaled (like in the affine AMVP mode) or derived on-the-fly (like in the affine merge mode). w and h are the width and height of the current block. In practice, the division is implemented by right-shift with a rounding operation. In an example, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (e.g., 4×4), the representative point is utilized to derive the motion vector for the whole sub-block.

Figure 14:
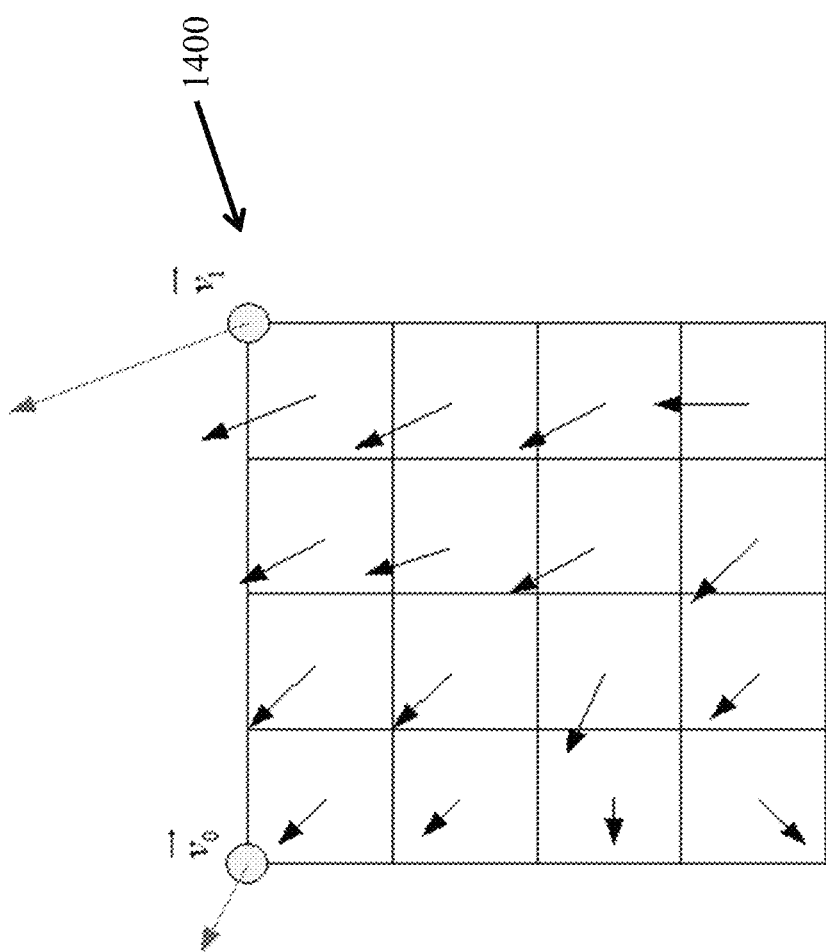
FIG. 14 shows an example of an affine motion vector field (MVF) per sub-block.

FIG. 14 shows an example of affine MVF per sub-block for a block 1400, wherein in order to further simplify the motion compensation prediction, sub-block based affine transform prediction is applied. To derive motion vector of each M×N sub-block, the motion vector of the center sample of each sub-block can be calculated according to Eqs. (1) and (2), and rounded to the motion vector fraction accuracy (e.g., 1/16 in JEM). Then the motion compensation interpolation filters can be applied to generate the prediction of each sub-block with derived motion vector. The interpolation filters for 1/16-pel are introduced by the affine mode. After the MCP, the high accuracy motion vector of each sub-block is rounded and saved as the same accuracy as the normal motion vector.

2.2.4 Examples for Signaling of Affine Prediction

Similar to the translational motion model, there are also two modes for signaling the side information due affine prediction. They are AFFINE_INTER and AFFINE_MERGE modes.

2.2.5 Examples of AF_INTER Mode

For CUs with both width and height larger than 8, AF_INTER mode can be applied. An affine flag in CU level is signaled in the bitstream to indicate whether AF_INTER mode is used.

In this mode, for each reference picture list (List 0 or List 1), an affine AMVP candidate list is constructed with three types of affine motion predictors in the following order, wherein each candidate includes the estimated CPMVs of the current block. The differences of the best CPMVs found at the encoder side (such as $mv_0$ $mv_1$ $mv_2$ in FIG. 17) and the estimated CPMVs are signalled. In addition, the index of affine AMVP candidate from which the estimated CPMVs are derived is further signalled.

1) Inherited Affine Motion Predictors

Figure 16:
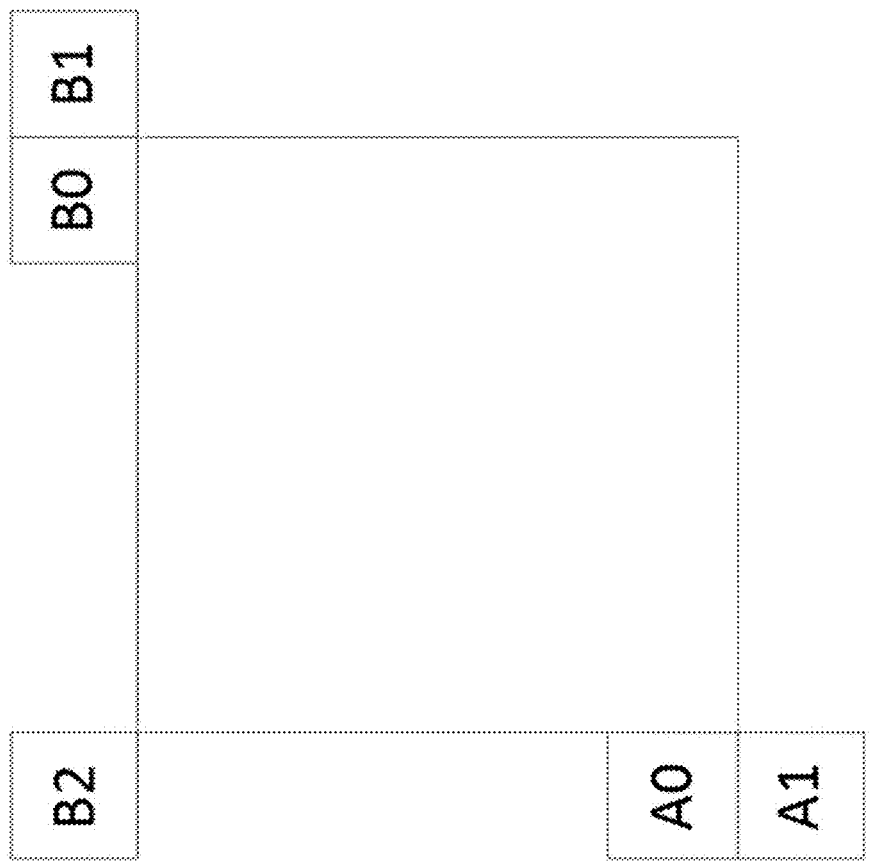
FIG. 16 shows an example of motion vector prediction for AF_INTER for inherited affine candidates.

The checking order is similar to that of spatial MVPs in HEVC AMVP list construction. First, a left inherited affine motion predictor is derived from the first block in {A1, A0} that is affine coded and has the same reference picture as in current block. Second, an above inherited affine motion predictor is derived from the first block in {B1, B0, B2} that is affine coded and has the same reference picture as in current block. The five blocks A1, A0, B1, B0, B2 are depicted in FIG. 16.

Figure 18A:
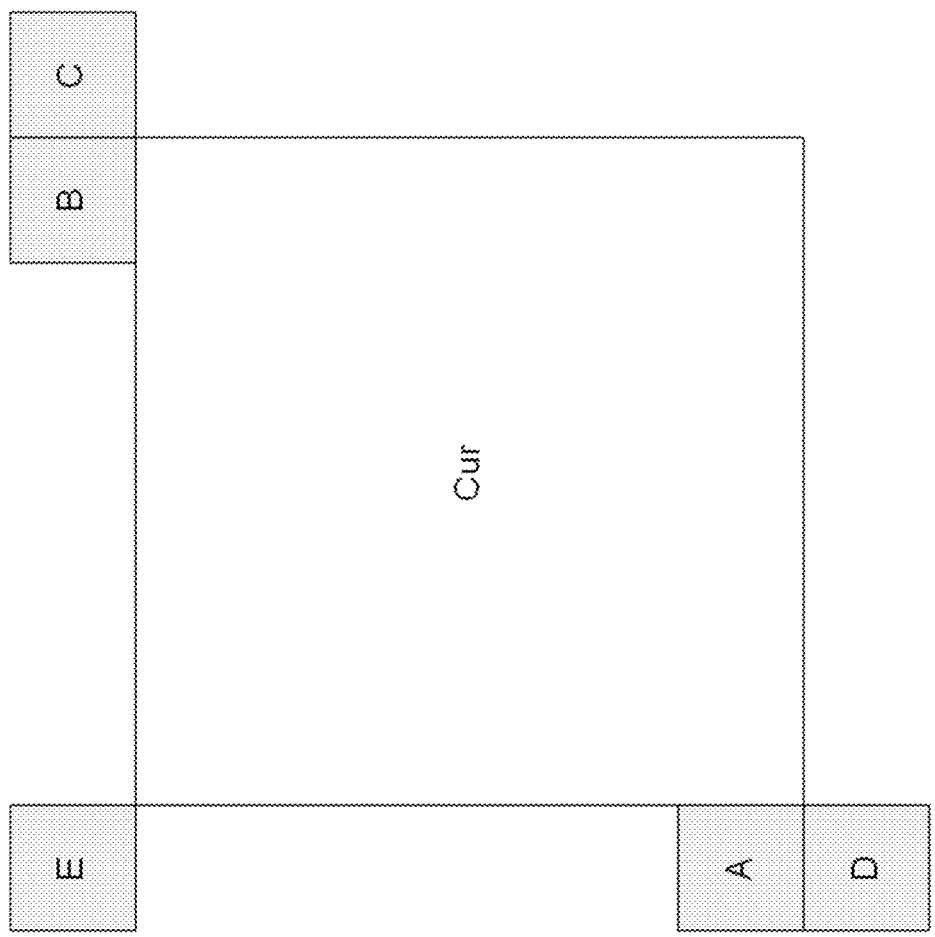
FIGS. 18A and 18B show example candidates for the AF_MERGE affine motion mode.
Figure 18B:
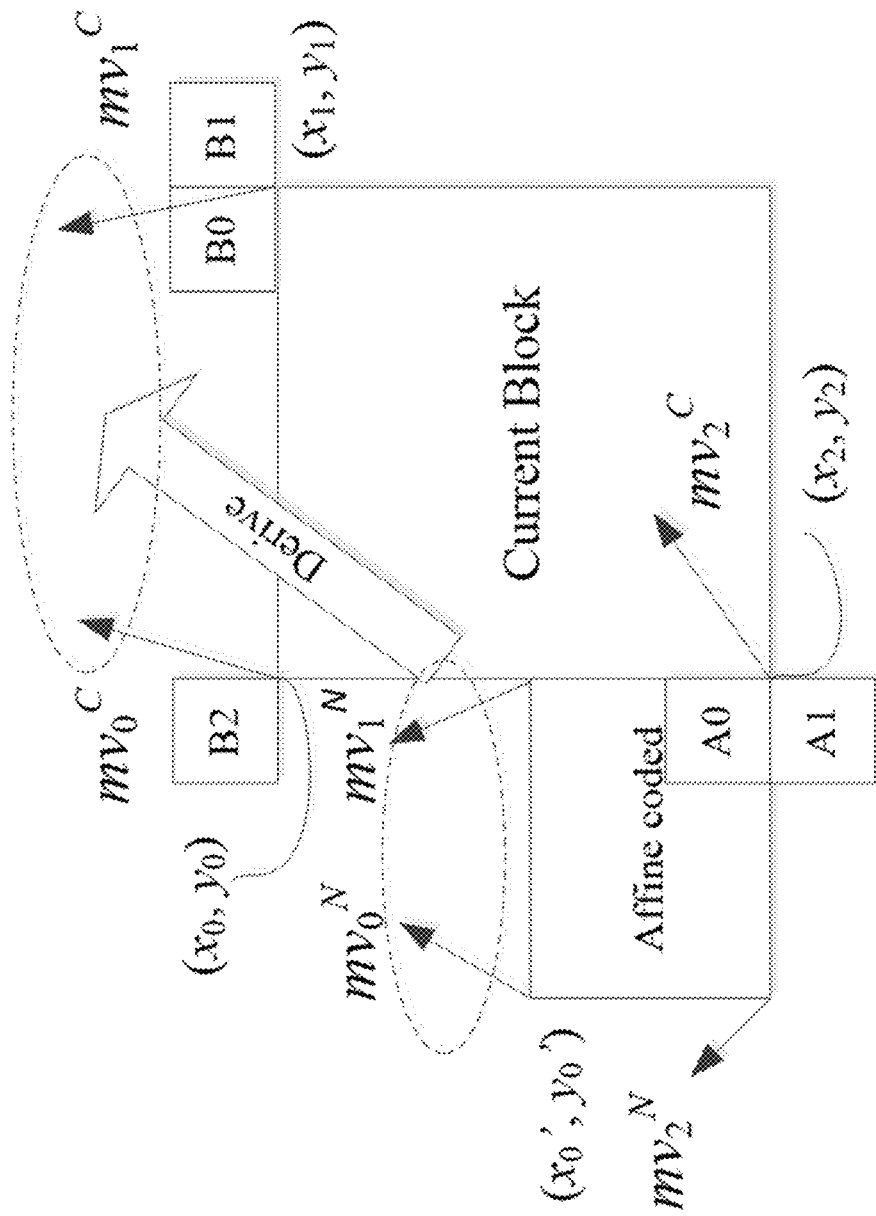

Once a neighboring block is found to be coded with affine mode, the CPMVs of the coding unit covering the neighboring block are used to derive predictors of CPMVs of current block. For example, if A1 is coded with non-affine mode and A0 is coded with 4-parameter affine mode, the left inherited affine MV predictor will be derived from A0. In this case, the CPMVs of a CU covering A0, as denoted by $MV_0^N$ for the top-left CPMV and $MV_1^N$ for the top-right CPMV in FIG. 18B are utilized to derive the estimated CPMVs of current block, denoted by $MV_0^C$, $MV_1^C$, $MV_2^C$ for the top-left (with coordinate (x0, y0)), top-right (with coordinate (x1, y1)) and bottom-right positions (with coordinate (x2, y2)) of current block.

2) Constructed Affine Motion Predictors

Figure 17:
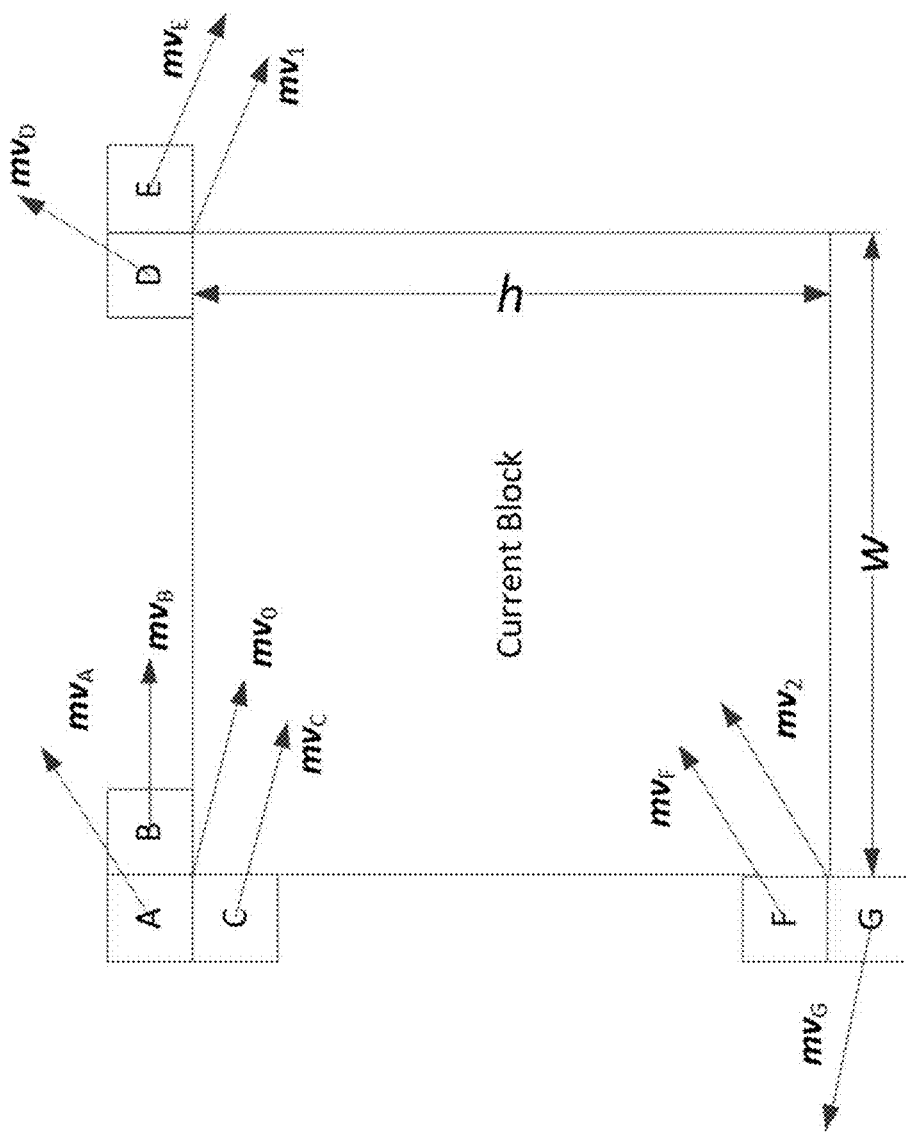
FIG. 17 shows an example of motion vector prediction for AF_INTER for constructed affine candidates.

A constructed affine motion predictor consists of control-point motion vectors (CPMVs) that are derived from neighboring inter coded blocks, as shown in FIG. 17, that have the same reference picture. If the current affine motion model is 4-parameter affine, the number of CPMVs is 2, otherwise if the current affine motion model is 6-parameter affine, the number of CPMVs is 3. The top-left CPMV $\overline{mv}_0$ is derived by the MV at the first block in the group {A, B, C} that is inter coded and has the same reference picture as in current block. The top-right CPMV $\overline{mv}_1$ is derived by the MV at the first block in the group {D, E} that is inter coded and has the same reference picture as in current block. The bottom-left CPMV $\overline{mv}_2$ is derived by the MV at the first block in the group {F, G} that is inter coded and has the same reference picture as in current block.

If the current affine motion model is 4-parameter affine, then a constructed affine motion predictor is inserted into the candidate list only if both $\overline{mv}_0$ and $\overline{mv}_1$ are founded, that is, $\overline{mv}_0$ and $\overline{mv}_1$ are used as the estimated CPMVs for top-left (with coordinate (x0, y0)), top-right (with coordinate (x1, y1)) positions of current block.

If the current affine motion model is 6-parameter affine, then a constructed affine motion predictor is inserted into the candidate list only if $\overline{mv}_0$, $\overline{mv}_1$ and $\overline{mv}_2$ are all founded, that is, $\overline{mv}_0$, $\overline{mv}_1$ and $\overline{mv}_2$ are used as the estimated CPMVs for top-left (with coordinate (x0, y0)), top-right (with coordinate (x1, y1)) and bottom-right (with coordinate (x2, y2)) positions of current block.

No pruning process is applied when inserting a constructed affine motion predictor into the candidate list.

3) Normal AMVP Motion Predictors

The following applies until the number of affine motion predictors reaches the maximum.

1) Derive an affine motion predictor by setting all CPMVs equal to $\overline{mv}_2$ if available.
2) Derive an affine motion predictor by setting all CPMVs equal to $\overline{mv}_1$ if available.
3) Derive an affine motion predictor by setting all CPMVs equal to $\overline{mv}_0$ if available.
4) Derive an affine motion predictor by setting all CPMVs equal to HEVC TMVP if available.
5) Derive an affine motion predictor by setting all CPMVs to zero MV.

Note that $\overline{mv}_1$ is already derived in constructed affine motion predictor.

Figure 15B:
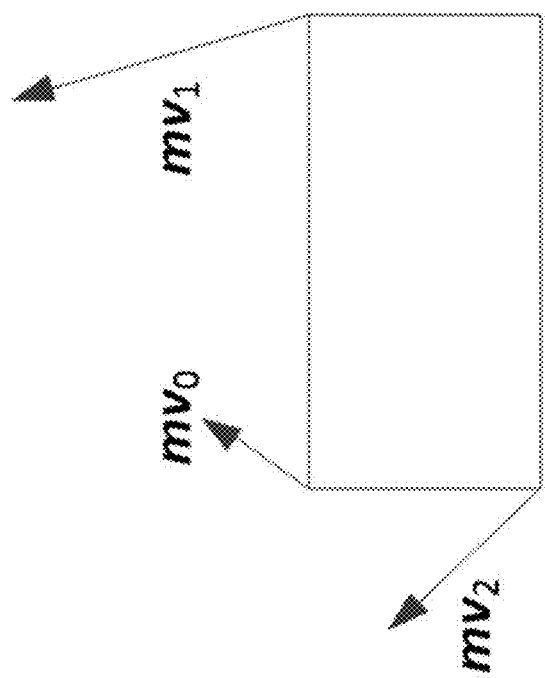
FIGS. 15A and 15B show examples of the 4-parameter and 6-parameter affine models, respectively.
Figure 15A:
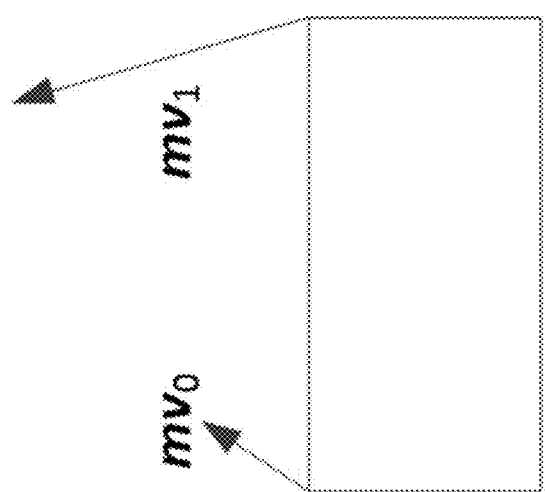

In AF_INTER mode, when 4/6 parameter affine mode is used, ⅔ control points are required, and therefore ⅔ MVD needs to be coded for these control points, as shown in FIGS. 15A and 15B. In an existing implementation, the MV may be derived as follows, e.g., it predicts mvd$_1$ and mvd$_2$ from mvd$_0$.

$mv_0 = \overline{mv}_0 + mvd_0$ $mv_1 = \overline{mv}_1 + mvd_1 + mvd_0$ $mv_2 = \overline{mv}_2 + mvd_2 + mvd_0$ Herein, $\overline{mv}_i$, mvd$_i$ and mv$_1$ are the predicted motion vector, motion vector difference and motion vector of the top-left pixel (i=0), top-right pixel (i=1) or left-bottom pixel (i=2) respectively, as shown in FIG. 15B. In some embodiments, the addition of two motion vectors (e.g., mvA(xA, yA) and mvB(xB, yB)) is equal to summation of two components separately. For example, newMV=mvA+mvB implies that the two components of newMV are set to (xA+xB) and (yA+yB), respectively.

2.2.6 Examples of AF_MERGE Mode

When a CU is applied in AF_MERGE mode, it gets the first block coded with an affine mode from the valid neighboring reconstructed blocks. And the selection order for the candidate block is from left, above, above right, left bottom to above left as shown in FIG. 18A (denoted by A, B, C, D, E in order). For example, if the neighbour left bottom block is coded in affine mode as denoted by A0 in FIG. 18B, the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$. It should be noted that sub-block (e.g. 4×4 block) located at the top-left corner stores mv0, the sub-block located at the top-right corner stores mv1 if the current block is affine coded. If the current block is coded with the 6-parameter affine model, the sub-block located at the bottom-left corner stores mv2; otherwise (with the 4-parameter affine model), LB stores mv2'. Other sub-blocks stores the MVs used for MC.

After the CPMV of the current CU v0 and v1 are computed according to the affine motion model in Eqs. (1) and (2), the MVF of the current CU can be generated. In order to identify whether the current CU is coded with AF_MERGE mode, an affine flag can be signaled in the bitstream when there is at least one neighboring block is coded in affine mode.

In some embodiments, an affine merge candidate list may be constructed with following steps:

1) Insert Inherited Affine Candidates

Figure 19:
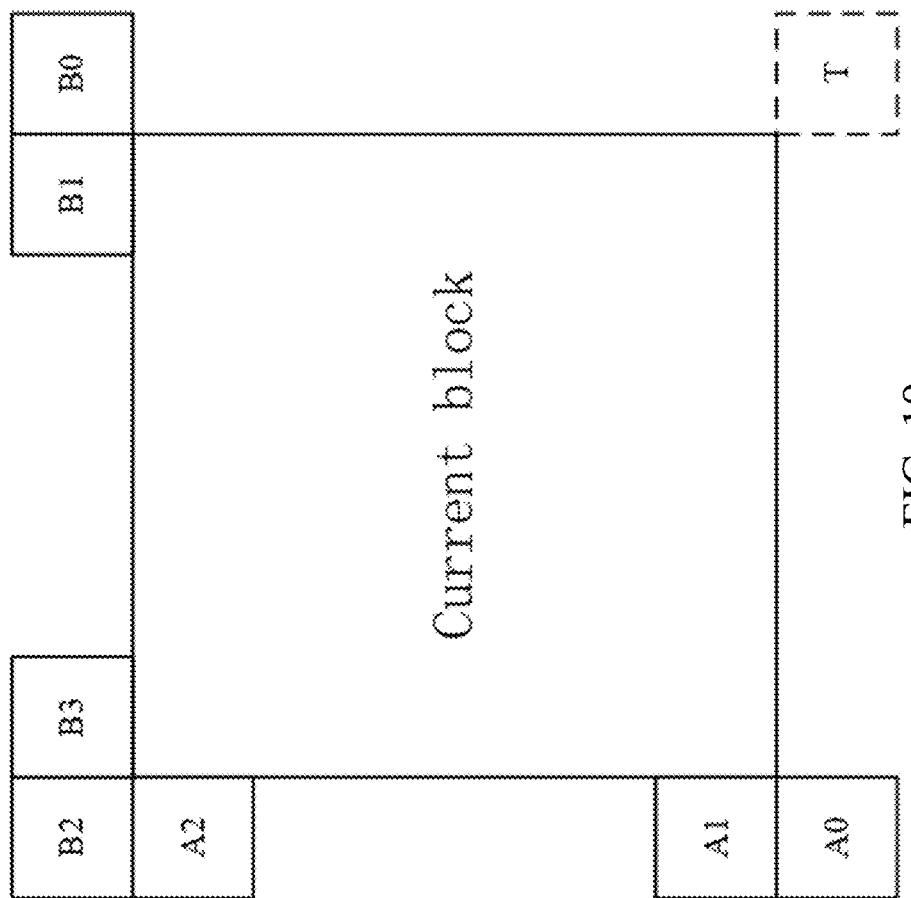
FIG. 19 shows an example of candidate positions for affine merge mode.

Inherited affine candidate means that the candidate is derived from the affine motion model of its valid neighbor affine coded block. In the common base, as shown in FIG. 19, the scan order for the candidate positions is: A1, B1, B0, A0 and B2.

After a candidate is derived, full pruning process is performed to check whether same candidate has been inserted into the list. If a same candidate exists, the derived candidate is discarded.

2) Insert Constructed Affine Candidates

If the number of candidates in affine merge candidate list is less than MaxNumAffineCand (set to 5 in this contribution), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIG. 19. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.
For CP3, the checking priority is A1→A0.
For CP4, T is used.

Secondly, the combinations of controls points are used to construct an affine merge candidate.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} will be converted to a 4-parameter motion model represented by top-left and top-right control points.

The combinations of constructed affine candidates are inserted into to candidate list as following order:
{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

For reference list X (X being 0 or 1) of a combination, the reference index with highest usage ratio in the control points is selected as the reference index of list X, and motion vectors point to difference reference picture will be scaled.

After a candidate is derived, full pruning process is performed to check whether same candidate has been inserted into the list. If a same candidate exists, the derived candidate is discarded.

3) Padding with Zero Motion Vectors

If the number of candidates in affine merge candidate list is less than 5, zero motion vectors with zero reference indices are insert into the candidate list, until the list is full.

In some embodiments, for the sub-block merge candidate list, a 4-parameter merge candidate with MVs set to (0, 0) and prediction direction set to uni-prediction from list 0 (for P slice) and bi-prediction (for B slice).

2.3 Examples of Intra Block Copy (IBC)

Figure 20:
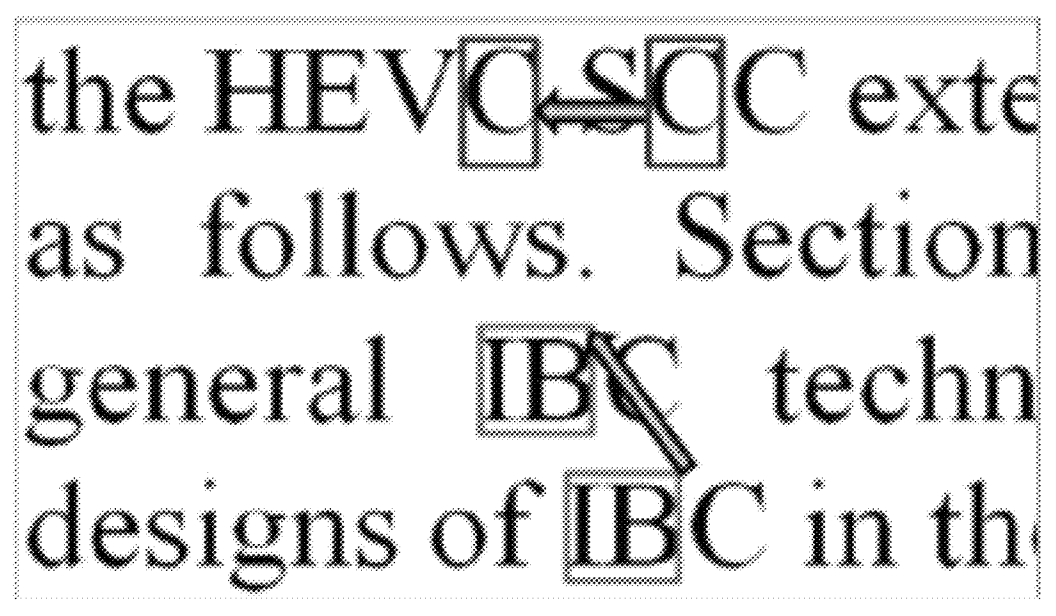

Intra block copy (IBC, or intra picture block compensation), also named current picture referencing (CPR) was adopted in HEVC screen content coding extensions (SCC). This tool is very efficient for coding of screen content video in that repeated patterns in text and graphics rich content occur frequently within the same picture. Having a previously reconstructed block with equal or similar pattern as a predictor can effectively reduce the prediction error and therefore improve coding efficiency. An example of the intra block compensation is illustrated in FIG. 20.

Similar to the design of CRP in HEVC SCC, In VVC, The use of the IBC mode is signaled at both sequence and picture level. When the IBC mode is enabled at sequence parameter set (SPS), it can be enabled at picture level. When the IBC mode is enabled at picture level, the current reconstructed picture is treated as a reference picture. Therefore, no syntax change on block level is needed on top of the existing VVC inter mode to signal the use of the IBC mode.

Some of the features of CPR include:
It is treated as a normal inter mode. Therefore, merge and skip modes are also available for the IBC mode. The merge candidate list construction is unified, containing merge candidates from the neighboring positions that are either coded in the IBC mode or the HEVC inter mode. Depending on the selected merge index, the current block under merge or skip mode can merge into either an IBC mode coded neighbor or otherwise a normal inter mode coded one with different pictures as reference pictures.
Block vector prediction and coding schemes for the IBC mode reuse the schemes used for motion vector prediction and coding in the HEVC inter mode (AMVP and MVD coding).
The motion vector for the IBC mode, also referred as block vector, is coded with integer-pel precision, but stored in memory in $\frac{1}{16}$-pel precision after decoding as quarter-pel precision is required in interpolation and deblocking stages. When used in motion vector prediction for the IBC mode, the stored vector predictor will be right shifted by 4.
Search range: it is restricted to be within the current CTU.
CPR is disallowed when affine mode/triangular mode/GBI/weighted prediction is enabled.

2.3.1 Harmonization with CPR

In PCT/CN2018/089920, several methods are proposed to harmonize CPR (a.k.a IBC) and some new coding tools.

2.4 Examples of Merge List Design in VVC

There are three different merge list construction processes supported in VVC:
(1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.
(2) Uni-Prediction TPM merge list: For triangular prediction mode, one merge list construction process for the two partitions is shared even two partitions could select their own merge candidate index. When constructing this merge list, the spatial neighbouring blocks and two temporal blocks of the block are checked. The motion information derived from spatial neighbours and temporal blocks are called regular motion candidates in our IDF. These regular motion candidates are further utilized to derive multiple TPM candidates. Please note the transform is performed in the whole block level, even two partitions may use different motion vectors for generating their own prediction blocks. In some embodiments, the uni-prediction TPM merge list size is fixed to be 5.
(3) Regular merge list: For remaining coding blocks, one merge list construction process is shared. Here, the spatial/temporal/HMVP, pairwise combined bi-prediction merge candidates and zero motion candidates may be inserted in order. Regular merge list size is signaled in slice header, and maximum value is 6.

Sub-Block Merge Candidate List

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes affine merge candidates, and ATMVP candidate, and/or sub-block based STMVP candidate.

In another example, the ATMVP merge candidate in the normal merge list is moved to the first position of the affine merge list. Such that all the merge candidates in the new list (i.e., sub-block based merge candidate list) are based on sub-block coding tools.

In still another example, a special merge candidate list, known as sub-block merge candidate list (a.k.a affine merge candidate list) is added besides the regular merge candidate list. The sub-block merge candidate list is filled with candidates in the following order:
 (a) ATMVP candidate (may be available or unavailable);
 (b) Inherited Affine candidates;
 (c) Constructed Affine candidates;
 (d) Padding as zero MV 4-parameter affine model The maximum number of candidates (denoted as ML) in the sub-block merge candidate list derived as below:
 (1) If the ATMVP usage flag (e.g. the flag may be named as "sps_sbtmvp_enabled_flag") is on (equal to 1), but the affine usage flag (e.g. the flag may be named as "sps_affine_enabled_flag") is off (equal to 0), then ML is set equal to 1.
 (2) If the ATMVP usage flag is off (equal to 0), and the affine usage flag is off (equal to 0), then ML is set equal to 0. In this case, the sub-block merge candidate list is not used.
 (3) Otherwise (the affine usage flag is on (equal to 1), the ATMVP usage flag is on or off), ML is signaled from the encoder to the decoder. Valid ML is 0≤ML≤5.

When constructing the sub-block merge candidate list, ATMVP candidate is checked first. If any one of the following conditions is true, ATMVP candidate is skipped and not put into the sub-block merge candidate list.
 (1) The ATMVP usage flag is off;
 (2) Any TMVP usage flag (e.g. the flag may be named as "slice_temporal_mvp_enabled_flag" when signaled at slice level) is off;
 (3) The reference picture with reference index 0 in reference list 0 is identical to the current picture (It is a CPR)

ATMVP in the above described example is much simpler than in JEM. When an ATMVP merge candidate is generated, the following process is applied:
 (a) Check neighbouring blocks A1, B1, B0, A0 as shown in FIG. 2 in order, to find the first inter-coded, but not CPR-coded block, denoted as block X;
 (b) Initialize TMV=(0,0). If there is a MV (denoted as MVn) of block X, referring to the collocated reference picture (as signaled in the slice header), TMV is set equal to MVn.
 (c) Suppose the center point of the current block is (x0, y0), then locate a corresponding position of (x0,y0) as M=(x0+MV*x, y0+MV*y) in the collocated picture. Find the block Z covering M.
  (i) If Z is intra-coded, then ATMVP is unavailable;
  (ii) If Z is inter-coded, MVZ_0 and MVZ_1 for the two lists of block Z are scaled to (Reflist 0 index 0) and (Reflist 1 index 1) as MVdefault0, MVdefault1, and stored.
 (d) For each 8×8 sub-block, suppose its center point is (x0S, y0S), then locate a corresponding position of (x0S, y0S) as MS=(x0S+MV*x, y0S+MV*y) in the collocated picture. Find the block ZS covering MS.
  (i) If ZS is intra-coded, MVdefault0, MVdefault1 are assigned to the sub-block;
  (ii) If ZS is inter-coded, MVZS_0 and MVZS_1 for the two lists of block ZS are scaled to (Reflist 0 index 0) and (Reflist 1 index 0) and are assigned to the sub-block.

Figure 21:
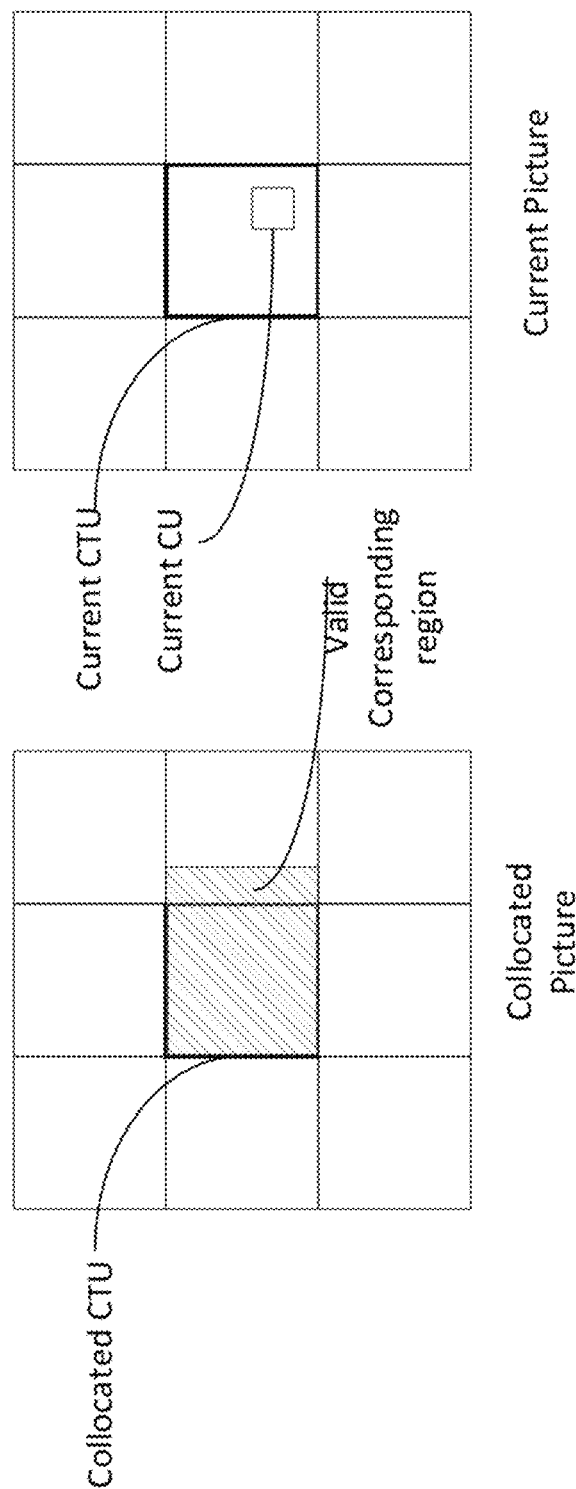
FIG. 21 shows an example of a valid corresponding region in a collocated picture.

MV Clipping and Masking in ATMVP:

When locating a corresponding position such as M or MS in the collocated picture, it is clipped to be inside a predefined region. The CTU size is S×S, S=128 in the present example. Suppose the top-left position of the collocated CTU is (xCTU, yCTU), then the corresponding position M or MS at (xN, yN) will be clipped into the valid region xCTU≤xN<xCTU+S+4; yCTU≤yN<yCTU+S. FIG. 21 shows an example of the valid region.

Besides clipping, (xN, yN) is also masked as xN=xN&MASK, yN=yN&MASK, where MASK is an integer equal to ~($2^N$−1), and N=3, to set the lowest 3 bits to be 0. So xN and yN must be numbers which are times of 8. ("~" represents the bitwise complement operator).

Regular Merge List

Different from the merge list design, in VVC, the history-based motion vector prediction (HMVP) method is employed. In some embodiments, combined bi-predictive merge candidates have been replaced by pairwise bi-predictive merge candidates.

HMVP

Figure 22:
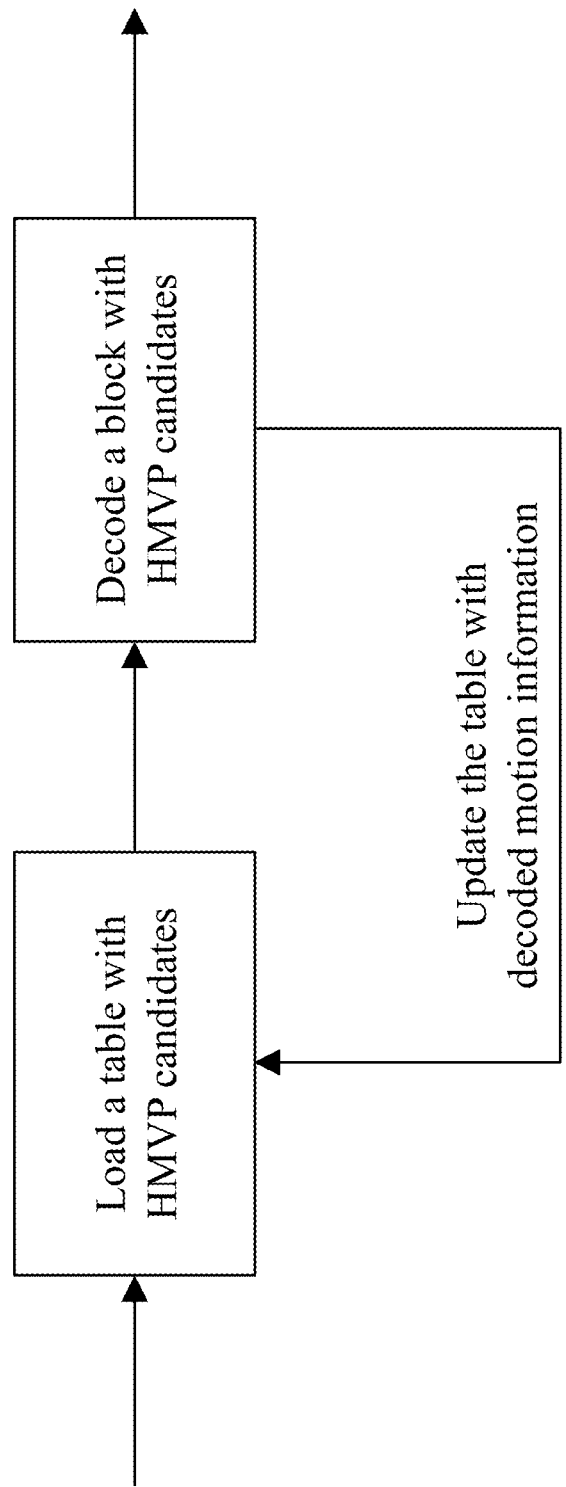
FIG. 22 shows an example of the coding flow for history-based motion vector prediction (HMVP) candidates.

In HMVP, the previously coded motion information is stored. The motion information of a previously coded block is defined as an HMVP candidate. Multiple HMVP candidates are stored in a table, named as the HMVP table, and this table is maintained during the encoding/decoding process on-the-fly. The HMVP table is emptied when starting coding/decoding a new slice. Whenever there is an inter-coded block, the associated motion information is added to the last entry of the table as a new HMVP candidate. The overall coding flow is depicted in FIG. 22.

Figure 23:
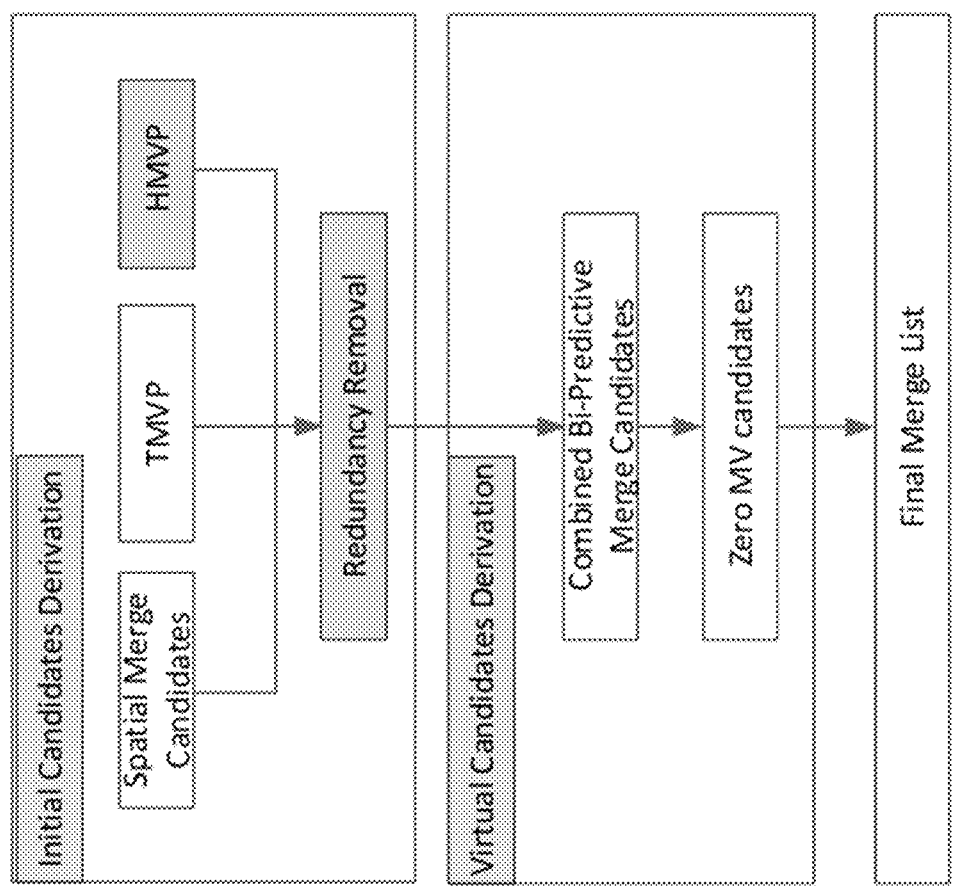
FIG. 23 shows an example of a modified merge list construction process.

HMVP candidates could be used in both AMVP and merge candidate list construction processes. FIG. 23 depicts the modified merge candidate list construction process (highlighted in grey). When the merge candidate list is not full after the TMVP candidate insertion, HMVP candidates stored in the HMVP table could be utilized to fill in the merge candidate list. Considering that one block usually has a higher correlation with the nearest neighbouring block in terms of motion information, the HMVP candidates in the table are inserted in a descending order of indices. The last entry in the table is firstly added to the list, while the first entry is added in the end. Similarly, redundancy removal is applied on the HMVP candidates. Once the total number of available merge candidates reaches the maximal number of merge candidates allowed to be signaled, the merge candidate list construction process is terminated.

2.5 Examples of Generalized Bi-Prediction (GBi) Improvement

Generalized Bi-prediction improvement (GBi) proposed in one example is provided.

GBi was proposed in one example. An improved embodiment that improved the gain-complexity trade-off for GBi is provide which applies unequal weights to predictors from L0 and L1 in bi-prediction mode. In inter prediction mode, multiple weight pairs including the equal weight pair (½, ½) are evaluated based on rate-distortion optimization (RDO), and the GBi index of the selected weight pair is signaled to the decoder. In merge mode, the GBi index is inherited from a neighboring CU. In the embodiment, GBi, the predictor generation in bi-prediction mode is shown in the equation below.

$$PGBi=(w0*PL0+w1*PL1+RoundingOffsetGBi)>>shiftNumGBi,$$

Herein, PGBi is the final predictor of GBi. w0 and w1 are the selected GBi weight pair and applied to the predictors of list 0 (L0) and list 1 (L1), respectively. RoundingOffsetGBi and shiftNumGBi are used to normalize the final predictor in GBi. The supported w1 weight set is {−¼, ⅜, ½, ⅝, 5/4}, in which the five weights correspond to one equal weight pair and four unequal weight pairs. The blending gain, i.e., sum of w1 and w0, is fixed to 1.0. Therefore, the corresponding w0 weight set is {5/4, ⅝, ½, ⅜, −¼}. The weight pair selection is at CU-level.

For non-low delay pictures, the weight set size is reduced from five to three, where the w1 weight set is {⅜, ½, ⅝} and the w0 weight set is {⅝, ½, ⅜}. The weight set size reduction for non-low delay pictures is applied to the GBi and all the GBi tests in this contribution.

In an embodiment, a combined solution is proposed to further improve the GBi performance. Specifically, the following modifications are applied on top of the existing GBi design in the embodiment.

GBi Encoder Bug Fix

To reduce the GBi encoding time, in current encoder design, the encoder will store uni-prediction motion vectors estimated from GBi weight equal to 4/8, and reuse them for uni-prediction search of other GBi weights. This fast encoding method is applied to both translation motion model and affine motion model. In one example, 6-parameter affine model was adopted together with 4-parameter affine model. The encoder does not differentiate 4-parameter affine model and 6-parameter affine model when it stores the uni-prediction affine MVs when GBi weight is equal to 4/8. Consequently, 4-parameter affine MVs may be overwritten by 6-parameter affine MVs after the encoding with GBi weight 4/8. The stored 6-parameter affine MVs may be used for 4-parameter affine ME for other GBi weights, or the stored 4-parameter affine MVs may be used for 6-parameter affine ME. The proposed GBi encoder bug fix is to separate the 4-parameter and 6-parameter affine MVs storage. The encoder stores those affine MVs based on affine model type when GBi weight is equal to 4/8, and reuse the corresponding affine MVs based on the affine model type for other GBi weights.

CU Size Constraint for GBi

In this method, GBi is disabled for small CUs. In inter prediction mode, if bi-prediction is used and the CU area is smaller than 128 luma samples, GBi is disabled without any signaling.

Merge Mode with GBi

With Merge mode, GBi index is not signaled. Instead it is inherited from the neighbouring block it is merged to. When TMVP candidate is selected, GBi is turned off in this block.

Affine Prediction with GBi

When the current block is coded with affine prediction, GBi can be used. For affine inter mode, GBi index is signaled. For Affine merge mode, GBi index is inherited from the neighbouring block it is merged to. If a constructed affine model is selected, GBi is turned off in this block.

2.6 Examples of Inter-Intra Prediction (IIP) Mode

With inter-intra prediction mode, multi-hypothesis prediction combines one intra prediction and one merge indexed prediction. Such a block is treated as a special inter-coded block. In a merge CU, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is exclusive of the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling.

The weights for combining predictions are described as follow. When DC or planar mode is selected or the CB width or height is smaller than 4, equal weights are applied. For those CBs with CB width and height larger than or equal to 4, when horizontal/vertical mode is selected, one CB is first vertically/horizontally split into four equal-area regions. Each weight set, denoted as (w_intrai, w_interi), where i is from 1 to 4 and (w_intra1, w_inter1)=(6, 2), (w_intra2, w_inter2)=(5, 3), (w_intra3, w_inter3)=(3, 5), and (w_intra4, w_inter4)=(2, 6), will be applied to a corresponding region. (w_intra1, w_inter1) is for the region closest to the reference samples and (w_intra4, w_inter4) is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring CUs.

Detailed Design in an Example 1. inter_intra_flag (one new context) is signaled if all the conditions are satisfied
   a. Merge but not skip
   b. Not affine
   c. Not MMVD
   d. W*H<64 and W !=128 and H !=128 (That means we may have 2*8 chroma intra-prediction here)
2. Inter-intra prediction can be applied on triangular prediction;
3. Inter-intra prediction is applied to Y, Cb and Cr.
4. If inter_intra_flag is on, the intra-prediction mode (IPM) is signaled. IPM must be one of {DC, Planar, Ver, Hor}
   a. 3 MPMs are involved.
   b. If W>2*H or H>2*W, IPM must be one of the 3 MPMs, and MPM-flag is not signaled; Otherwise, MPM-flag is signaled (one new context, why not share the same context with intra?)
      i. If MPM_flag is on, signal the selected MPM. 0, 10, 11 represents the three MPMs (bypass)
      ii. Otherwise, find the one in {DC, Planar, Ver, Hor} which is not in MPM list, as the IPM.
   c. MPM list construction (different to Intra MPM list)
      i. Set LeftIPM=AboveIPM=DC;
      ii. If the left neighbouring block (A2) is intra-coded or inter-intra-coded, set leftIPM to the IPM of the left neighbouring block;
      iii. If the above neighbouring block (B3) is intra-coded or inter-intra-coded, set aboveIPM to the IPM of the above neighbouring block;

iv. leftIPM=(leftIPM>DC_IDX)? ((leftIPM≤DIA_IDX)? HOR_IDX: VER_IDX):leftIPM;
v. aboveIPM=(aboveIPM>DC_IDX)? ((aboveIPM≤DIA_IDX) ? HOR_IDX:VER_IDX):aboveIPM; (What about the wide-angle modes?)
vi. If leftIPM, aboveIPM
  1. If leftIPM is not DC or planar
     a. MPM[0], leftIPM, MPM[1]=Planar, MPM[2]=DC
  2. Otherwise,
     a. MPM[0]=DC, MPM[1]=Planar, MPM[2]=Ver
vii. Otherwise
  1. MPM[0], leftIPM, MPM[1]=aboveIPM
  2. If non of leftIPM and aboveIPM is planar, MPM[2]=Planar
  3. Otherwise: MPM[2]=(leftIPM+aboveIPM)<2? Ver: DC
viii. If W>2*H
  1. If MPM[x]==Hor, Find ModeX in {DC, Planar, Ver, Hor} but not in the MPM list, set MPM[x]=ModeX;
ix. If H>2*W
  1. If MPM[x]==Ver, Find ModeX in {DC, Planar, Ver, Hor} but not in the MPM list, set MPM[x]=ModeX;
5. It should be noted that the IPM used by inter-intra-prediction cannot be used to predict IPM of an intra-coded block.
  a. An intra-coded block treated an inter-intra coded block as inter-coded
6. Neighbouring sample filtering: As intra-prediction:
  a. No filtering for DC/VER/HOR
  b. Filtering for Planar when W*H>32;
  c. PDPC is kept
7. Weighting sum method
  a. $P(x,y)=Clip((W0(x,y)*P\_Intra(x,y)+W1(x,y)*P\_Inter(x,y))>>3)$
8. Weighting values (may be improved or simplified)
  a. If mode==DC/Planar||W<4||H<4: W0=W1=4;
  b. If mode==HOR:
    i. W0=6, W1=2 if x<W/4;
    ii. W0=5, W1=3 if W/4≤x<W/2;
    iii. W0=3, W1=5 if W/2≤x<3*W/4;
    iv. W0=2, W1=6 if x≥3*W/4;
  c. If mode==VER:
    i. W0=6, W1=2 if y<H/4;
    ii. W0=5, W1=3 if H/4≤y<H/2;
    iii. W0=3, W1=5 if H/2≤y<3*H/4;
    iv. W0=2, W1=6 if y≥3*H/4.

2.7 Examples of Ultimate Motion Vector Expression (UMVE)

In some embodiments, ultimate motion vector expression (UMVE) is presented. UMVE is used for either skip or merge modes with a proposed motion vector expression method.

UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

TABLE 2

| Distance IDX | | | | | | | | |
|---|---|---|---|---|---|---|---|---|
| | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 3

| Direction IDX | | | | |
|---|---|---|---|---|
| Direction IDX | 00 | 01 | 10 | 11 |
| x-axis | + | − | N/A | N/A |
| y-axis | N/A | N/A | + | − |

UMVE flag is signaled right after sending a skip flag or merge flag. If skip or merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, but, if not 1, skip/merge index is parsed for skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In current common test condition, either the first or the second merge candidate in the merge candidate list could be selected as the base candidate.

UMVE is known as Merge with MVD (MMVD).

3 Drawbacks of Existing Implementations

In existing implementations (e.g., current VVC design), CPR has these issues:
- (1) Interaction between CPR and affine is still unclear. (e.g., for CPR coded blocks, the merge candidates may be inserted to the sub-block merge list or regular merge list).
- (2) Interaction between CPR and general bi-prediction is still unclear. (e.g., for CPR coded blocks, always using fixed half-half weight, therefore, no need to signal weights index).
- (3) Interaction between CPR and MMVD (a.k.a. UMVE) is still unclear.
- (4) Interaction between CPR and inter-intra prediction is still unclear.
- (5) Interaction between ATMVP and CPR.
- (6) How to apply CPR with the dual (separate) coding tree is still unclear.

4 Example Methods for Motion Vector Derivation and Signaling for CPR

Embodiments of the presently disclosed technology overcome the drawbacks of existing implementations, thereby providing video coding with higher coding efficiencies. The use of motion vector derivation and signaling for current picture referencing in video and image coding, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined. It should be noted that "a block or a candidate uses CPR" may mean:
- (i) All reference pictures used by the block or candidate are CPR; or
- (ii) At least one reference picture used by the block or candidate is CPR.

Example 1

CPR is not allowed to be used when affine motion compensation is used.
- (a) In one example, a conformance bit-stream cannot use CPR and affine motion compensation simultaneously in a single block.
- (b) In one example, in the parsing process, the block-level affine enabling/disabling flag may be firstly signaled. When one block is coded with the affine mode, there is no need to signal whether the current block's reference picture index is equal to the one that current picture is associated with.
- (c) Alternatively, reference picture indices may be signaled before the block-level affine enabling/disabling flag. When a block uses CPR, the signalling of affine flag is always skipped.
- (d) Alternatively, reference picture indices may be signaled before the block-level affine enabling/disabling flag. When a block is coded with bi-prediction and only one reference picture is the current reference picture, the affine flag may be still signalled.
  - (i) In one example, furthermore, it is required that integer motion vectors are used for such a block.

Example 2

A block cannot inherit affine model from a neighbouring block which uses CPR.
- (a) In one example, a neighbouring block using CPR cannot be used to derive an affine merge candidate in the sub-block merge candidate list.
  - (i) In one example, a neighbouring block using CPR is treated as unavailable in the sub-block merge candidate list construction process.
- (b) In one example, a neighbouring block using CPR cannot be used to derive an affine AMVP candidate in the affine AMVP list.
  - (i) In one example, a neighbouring block using CPR is treated as unavailable in the affine AMVP candidate list construction process.

Example 3

Whether a block can inherit affine model from a neighbouring block which uses CPR or not, may depend on reference list.
- (a) In one example, suppose the neighbouring block applies bi-prediction, the reference picture in reference list X (X may be 0 or 1) is the current picture and the reference picture in reference list (1−X) is not the current picture, then
  - (i) Motion information of the neighbouring block referring to reference list X cannot be used to derive an affine merge candidate in the sub-block merge candidate list.
    - (1) In one example, motion information of the neighbouring block referring to reference list (1−X) may be used to derive an affine merge candidate in the sub-block merge candidate list.
  - (ii) Motion information of the neighbouring block referring to reference list X cannot be used to derive an affine AMVP candidate in the affine AMVP list.
    - (1) For example, motion information of the neighbouring block referring to reference list X cannot be used to derive an affine AMVP candidate in the affine AMVP list for reference list X.
  - (iii) Motion information of the neighbouring block referring to reference list (1−X) may be used to derive an affine AMVP candidate in the affine AMVP list.
    - (1) For example, Motion information of the neighbouring block referring to reference list (1−X) may be used to derive an affine AMVP candidate in the affine AMVP list for reference list (1−X).

Example 4

CPR is not allowed to be used when GBi is applied (GBi weighting values are not equal on the two reference pictures) in a block.
- (a) In one example, a conformance bit-stream cannot use CPR and GBi simultaneously in a single block.
- (b) In one example, if CPR is used in a block, the GBi weighting index is not signaled and inferred to be 0 (weighting values are equal on the two reference pictures).
- (c) In one example, if un-equal weights in GBi is applied (GBi weighting values are not equal on the two reference pictures) in a block, the CPR indication is not signaled and inferred to be 0 (CPR is not used).

Example 5

CPR is not allowed to be used when MMVD is applied in a block.
- (a) In one example, a conformance bit-stream cannot use CPR and MMVD simultaneously in a single block.
- (b) In one example, if CPR is used in a block, MMVD flag is not signaled and inferred to be 0 (weighting values are equal on the two reference pictures).
- (c) In one example, if MMVD is applied in a block, the CPR indication is not signaled and inferred to be 0 (CPR is not used).

Example 6

CPR is allowed to be used when MMVD is applied in a block.
- (a) In one example, if the base MV candidate has at least one reference pictures referring to the current picture:
  - (i) In one example, MMVD is based on the MV referring to the current picture, omitting the MV not referring to the current picture (if existing);
  - (ii) In one example, the distances signaled by MMVD can only be integers.
  - (iii) In one example, MMVD is uni-predicted.
- (b) In one example, if the base MV candidate has at least one reference pictures not referring to the current picture:
  - (i) In one example, MMVD is based on the MV referring not to the current picture, omitting the MV referring to the current picture (if existing);

Example 7

CPR is not allowed to be used when inter-intra prediction is applied in a block.
- (a) In one example, a conformance bit-stream cannot use CPR and inter-intra prediction simultaneously in a single block.
- (b) In one example, if CPR is used in a block, the inter-intra prediction flag is not signaled and inferred to be 0.
- (c) In one example, if inter-intra prediction is applied in a block, the CPR indication is not signaled and inferred to be 0 (CPR is not used).

Example 8

CPR is allowed to be used when inter-intra prediction is applied in a block.
- (a) In one example, if the merge candidate to do inter-intra prediction has at least one reference pictures referring to the current picture:
  - (i) In one example, inter-intra prediction is based on the MV referring to the current picture, omitting the MV not referring to the current picture (if existing);
  - (ii) In one example, the intra-prediction part of the inter-intra-prediction may be changed as:
    - (1) Boundary filtering is not conducted;
    - (2) Position Dependent Prediction Combination (PDPC) is not conducted;
    - (3) Only these specific modes are allowed:
      MPMs
      DC
      Vertical
      Horizontal
    - (iii) In one example, the inter-prediction part of the inter-intra-prediction is uni-predicted.
- (b) In one example, if the merge candidate to do inter-intra prediction has at least one reference pictures not referring to the current picture:
  - (i) In one example, inter-intra prediction is based on the MV referring not to the current picture, omitting the MV referring to the current picture (if it exists).

Example 9

In the process of ATMVP:
- (a) A neighbouring block is treated as unavailable if it uses CPR;
- (b) If a block in the collocated picture uses CPR
  - (i) It may be treated as unavailable in the ATMVP process;
  - (ii) It may be treated as available and a MV' can be derived from that block for the current block or sub-block.
    - (1) In one example, the MV' refers to the current picture and is copied from the block in the collocated picture.

Example 10

When CPR is coded as a new mode in addition to intra, inter modes (instead of being indicated as a specific reference picture in a reference picture list), whether to skip signalling of the CPR mode may depend on the decoded information of other coding methods.
- (a) In one example, the other coding methods may include, e.g., affine flag, inter-intra prediction flag, GBI index representing un-equal weights, MMVD, ATMVP.
- (b) When any one of the other coding method is applied to one block, the signalling of the CPR mode for this block is skipped.
- (c) Alternatively, whether to skip signalling of usage of other coding methods may depend on the decoded information of CPR mode.

Example 11

When the luma component and chroma components are coded with separated coding structure trees:
- (a) In one example, when chroma components are coded, MV information (MV may refer to the current picture) of the corresponding block of the luma component can be used as a MV prediction or merge candidate.
  - (i) The corresponding block of the luma component may be at any position (such as top-left, top-right, bottom-left, bottom-right or center) in the current chroma block.
    - (1) If the colour format is not 4:4:4, the current chroma block should be scaled to find the corresponding luma block.
  - (ii) In one example, there may be MV information from several corresponding blocks of the luma component severing as MV prediction or merge candidate for the current chroma block. Which one of them is selected may be signaled to the decoder or derived at the decoder.
- (b) The width/height of a chroma block using CPR may have restrictions.
  - (i) In one example, the width/height of a chroma block using CPR may be restricted differently from an intra-coded chroma block.

(ii) In one example, width >2 && height >2 for intra coded block but width ≥2 && height ≥2 for CPR coded.

The examples described above may be incorporated in the context of the method described below, e.g., methods 2400, 2500, 2600 and 2700, which may be implemented at a video decoder or a video encoder.

Figure 24:
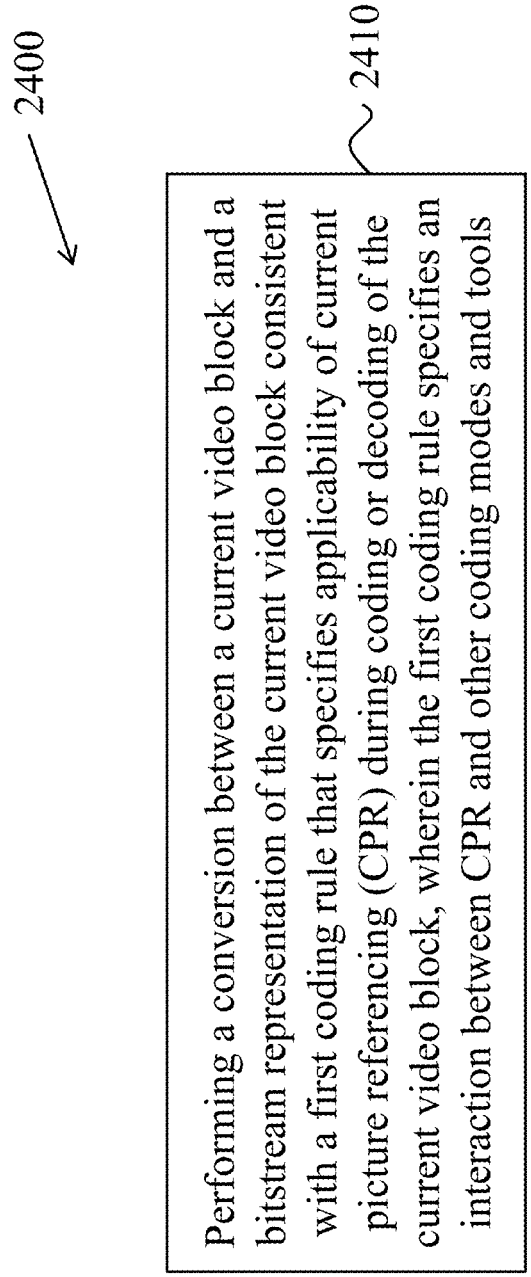
FIG. 24 shows a flowchart of an example method for video processing.

FIG. 24 shows a flowchart of an exemplary method for video processing. The method 2400 includes, at step 2410, performing a conversion between a current video block and a bitstream representation of the current video block consistent with a first coding rule that specifies applicability of current picture referencing (CPR) during coding or decoding of the current video block, wherein the first coding rule specifies at least one of (a) refraining from simultaneously using CPR and affine motion compensation during the conversion, or (b) disabling, for the conversion, inheriting an affine model of a neighboring block that uses CPR for coding, or (c) inheriting, for the conversion, the affine model of the neighboring block only in case that a coding condition is met, or (d) refraining from simultaneously using CPR and generalized bi-prediction (GBi) for the conversion, wherein the GBi uses non-equally weighted reference pictures, or (e) refraining from simultaneously using CPR and a merge with motion vector differences (MMVD) mode, or (f) simultaneously using CPR and the MMVD mode, or (g) refraining from simultaneously using CPR and inter-intra prediction, or (h) simultaneously using CPR and inter-intra prediction, or (i) simultaneously using an alternative temporal motion vector predictor.

In some embodiments, and in the context of Example 1, integer precision is used for coding rule (a).

In some embodiments, and in the context of Example 6, the MMVD mode comprises a uni-prediction for coding rules (e) or (f).

In some embodiments, and in the context of Example 8, the inter-intra prediction comprises an intra-prediction part and an inter-prediction part for coding rules (g) and (h). In an example, the intra-prediction part excludes boundary filtering. In another example, the intra-prediction part excludes position dependent prediction combination. In yet another example, the intra-prediction part comprises most probable mode selection, a DC prediction mode, a horizontal prediction mode or a vertical prediction mode. In yet another example, the inter-prediction part comprises uni-prediction.

Figure 25:
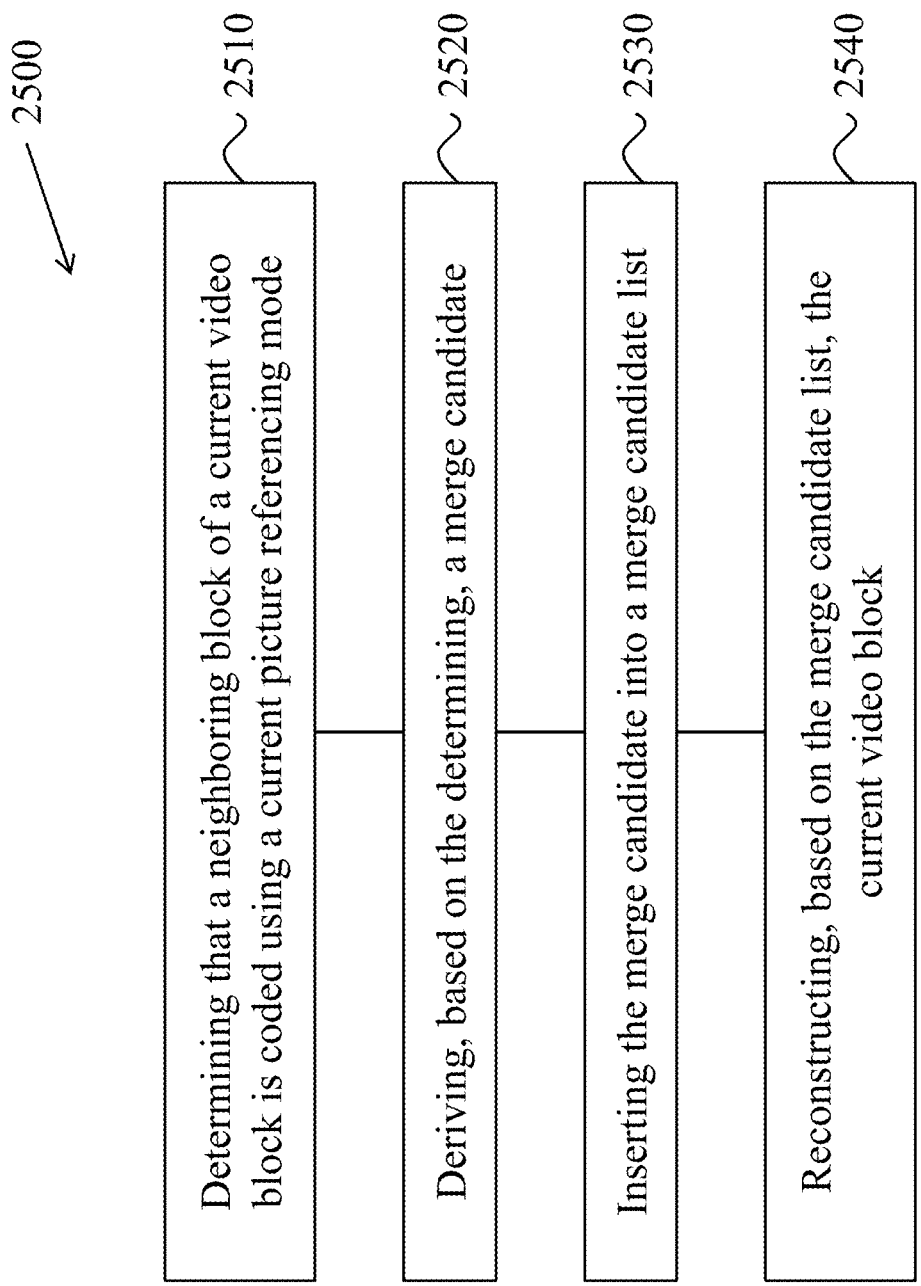
FIG. 25 shows a flowchart of another example method for video processing.

FIG. 25 shows a flowchart of another exemplary method for video processing. The method 2500 includes, at step 2510, determining that a neighboring block of a current video block is coded using a current picture referencing mode.

The method 2500 includes, at step 2520, deriving, based on the determining, a merge candidate. In some embodiments, and in the context of Example 2, the merge candidate comprises a first affine model different from a second affine model of the neighboring block. In an example, the merge candidate comprises an affine merge candidate, and wherein the merge candidate list comprises a sub-block merge candidate list. In another example, the merge candidate comprises an affine AMVP candidate, and wherein the merge candidate list comprises an affine AMVP candidate list.

In some embodiments, and in the context of Example 9, the merge candidate may include an alternative temporal motion vector prediction (ATMVP) candidate.

The method 2500 includes, at step 2530, inserting the merge candidate into a merge candidate list.

The method 2500 includes, at step 2540, reconstructing, based on the merge candidate list, the current video block.

In some embodiments, and in the context of Example 3, the neighboring block applies bi-prediction, and the method 2500 further includes the step of determining, based on a first reference picture list or a second reference picture list, an affine model of the merge candidate. In an example, the first reference picture list comprises a current picture of the current video block, and the affine model is determined based on at least one picture in the second reference picture list. In another example, the merge candidate comprises an AMVP candidate, and the merge candidate list comprises an affine AMVP candidate list.

Figure 26:
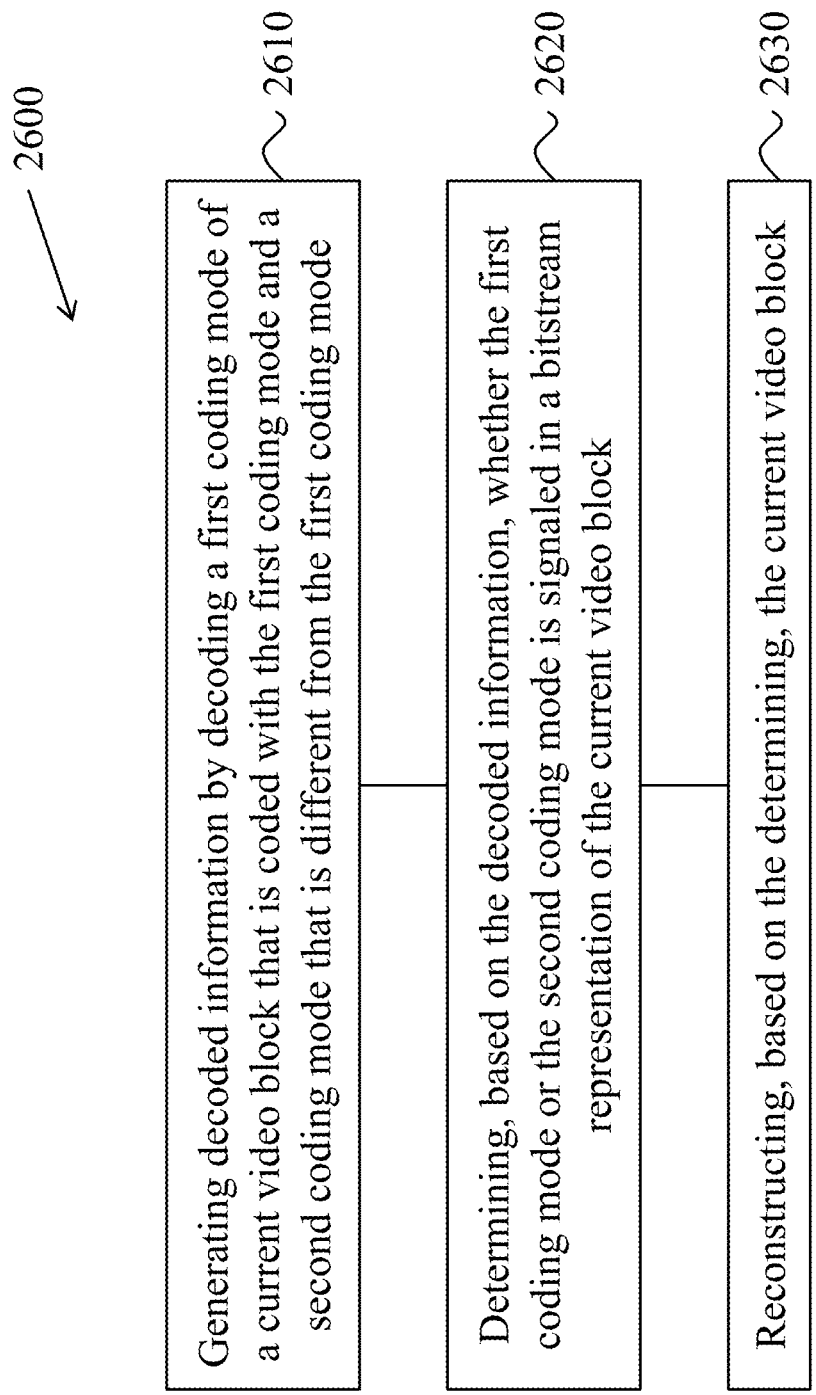
FIG. 26 shows a flowchart of yet another example method for video processing.

FIG. 26 shows a flowchart of yet another exemplary method for video processing. The method 2600 includes, at step 2610, generating decoded information by decoding a first coding mode of a current video block that is coded with the first coding mode and a second coding mode that is different from the first coding mode.

The method 2600 includes, at step 2620, determining, based on the decoded information, whether the first coding mode or the second coding mode is signaled in a bitstream representation of the current video block.

The method 2600 includes, at step 2630, reconstructing, based on the determining, the current video block.

In some embodiments, and in the context of Example 10, the first coding mode comprises an affine coding mode, an inter-intra prediction mode, a generalized bi-prediction prediction mode with unequal weights, a merge with motion vector differences mode or an alternative temporal motion vector prediction mode, the second coding mode comprises a CPR mode, and the bitstream representation excludes a flag for the CPR mode.

In some embodiments, and in the context of Example 10, first coding mode comprises a current picture referencing (CPR) mode, the second coding mode comprises an affine coding mode, an inter-intra prediction mode, a generalized bi-prediction prediction mode with unequal weights, a merge with motion vector differences mode or an alternative temporal motion vector prediction mode, and the bitstream representation excludes a flag for the second coding mode.

Figure 27:
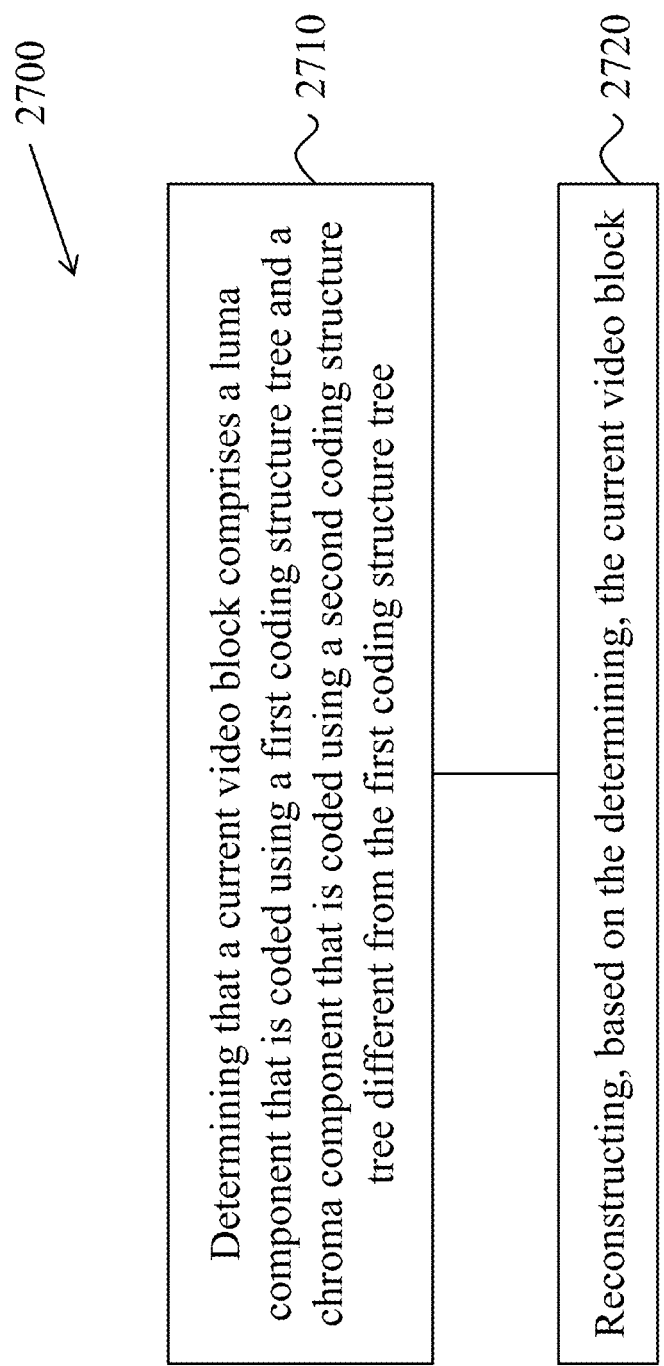
FIG. 27 shows a flowchart of yet another example method for video processing.

FIG. 27 shows a flowchart of yet another exemplary method for video processing. The method 2700 includes, at step 2710, determining that a current video block comprises a luma component that is coded using a first coding structure tree and a chroma component that is coded using a second coding structure tree different from the first coding structure tree.

The method 2700 includes, at step 2720, reconstructing, based on the determining, the current video block. In some embodiments, and in the context of Example 11, the reconstructing comprises decoding the chroma component based on motion vector information that is derived from one or more corresponding blocks of the luma component. In an example, the one or more corresponding blocks of the luma component is in a top-left position, a top-right position, a bottom-left position, a bottom-right position or a center position of the current video block. In another example, the method 2700 further includes the step of scaling, upon determining that a color format of the chroma component is different from a 4:4:4 color format, the current video block to determine the one or more corresponding blocks of the luma component.

In some embodiments, and in the context of Example 11, the current video block is coded using a current picture referencing (CPR) mode. In an example, a first set of restrictions on a height and a width of the current video block is different from a second set of restrictions on a height and a width of an intra-coded video block different from the current video block.

5 Example Implementations of the Disclosed Technology

Figure 28:
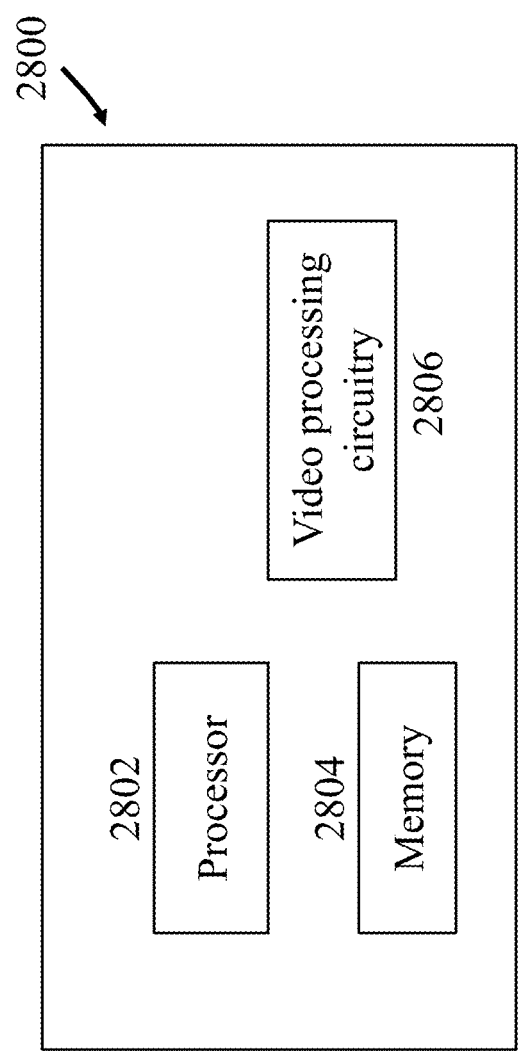
FIG. 28 is a block diagram of an example of a hardware platform for implementing a visual media decoding or a visual media encoding technique described in the present document.

FIG. 28 is a block diagram of a video processing apparatus 2800. The apparatus 2800 may be used to implement one or more of the methods described herein. The apparatus 2800 may be embodied in a smartphone, tablet, computer, Internet of Things (IoT) receiver, and so on. The apparatus 2800 may include one or more processors 2802, one or more memories 2804 and video processing hardware 2806. The processor(s) 2802 may be configured to implement one or more methods (including, but not limited to, methods 2400, 2500, 2600 and 2700) described in the present document. The memory (memories) 2804 may be used for storing data and code used for implementing the methods and techniques described herein. The video processing hardware 2806 may be used to implement, in hardware circuitry, some techniques described in the present document.

FIG. 29 shows a flowchart of yet another exemplary method for video processing. The method 2900 includes, at step 2910, determining that an Intra-Block-Copy (IBC) mode is applied to a current video block of a video, wherein in the IBC mode, at least one reference picture used by the current video block is a current picture where the current video block is located in; at step 2920, making a decision regarding a disabling of a specific coding mode for the current block; at step 2930, performing, based on the decision, a conversion between the current video block and the bitstream representation, wherein the specific coding mode uses a motion vector and a non-current picture to derive a prediction of a video block.

Figure 30:
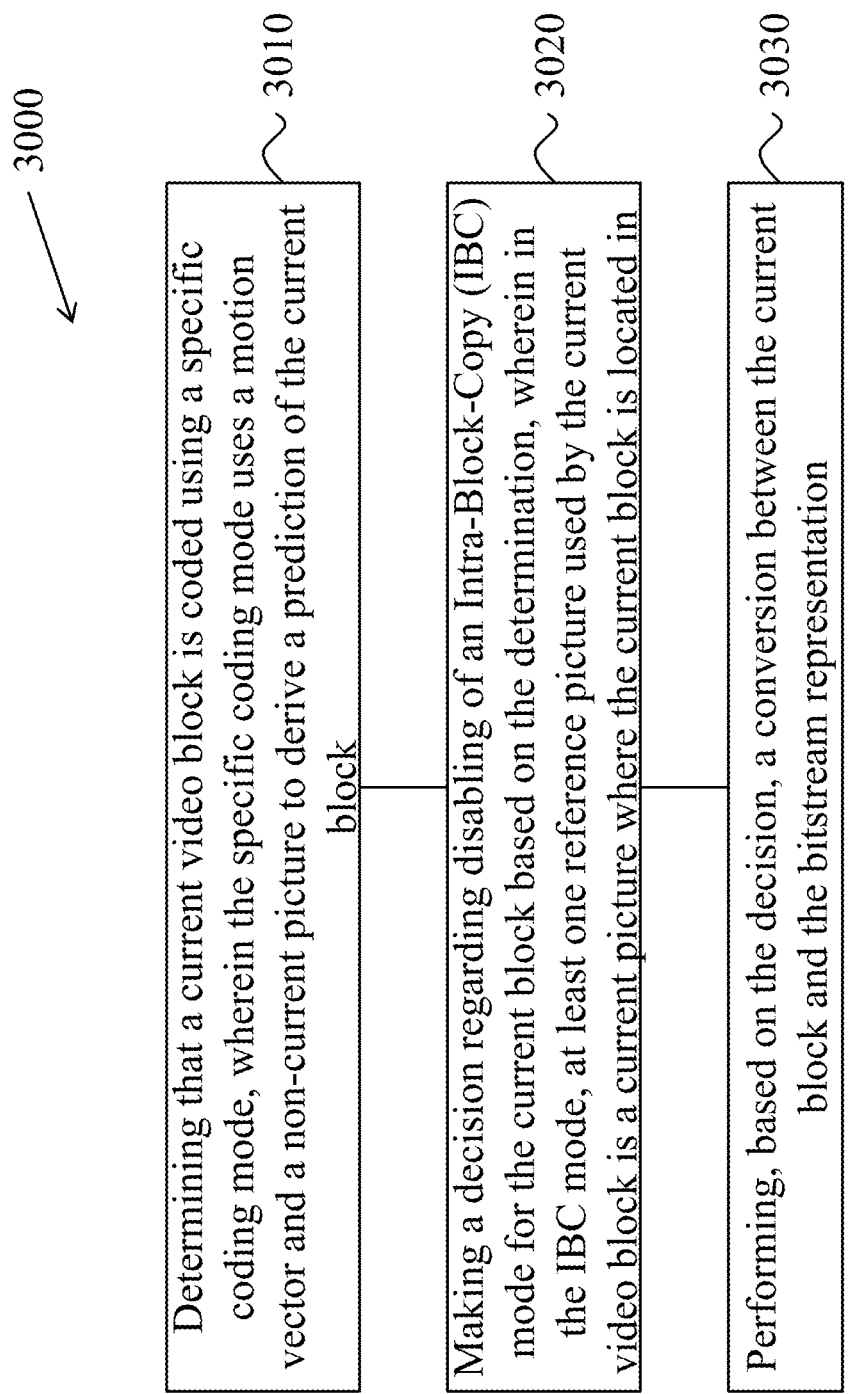
FIG. 30 shows a flowchart of yet another example method for video processing.

FIG. 30 shows a flowchart of yet another exemplary method for video processing. The method 3000 includes, at step 3010, determining that a current video block is coded using a specific coding mode; at step 3020, making a decision regarding disabling of an Intra-Block-Copy (IBC) mode for the current block based on the determination, wherein in the IBC mode, at least one reference picture used by the current video block is a current picture where the current block is located in; at step 3030, performing, based on the decision, a conversion between the current block and the bitstream representation, wherein the specific coding mode uses a motion vector and a non-current picture to derive a prediction of the current block.

Figure 31:
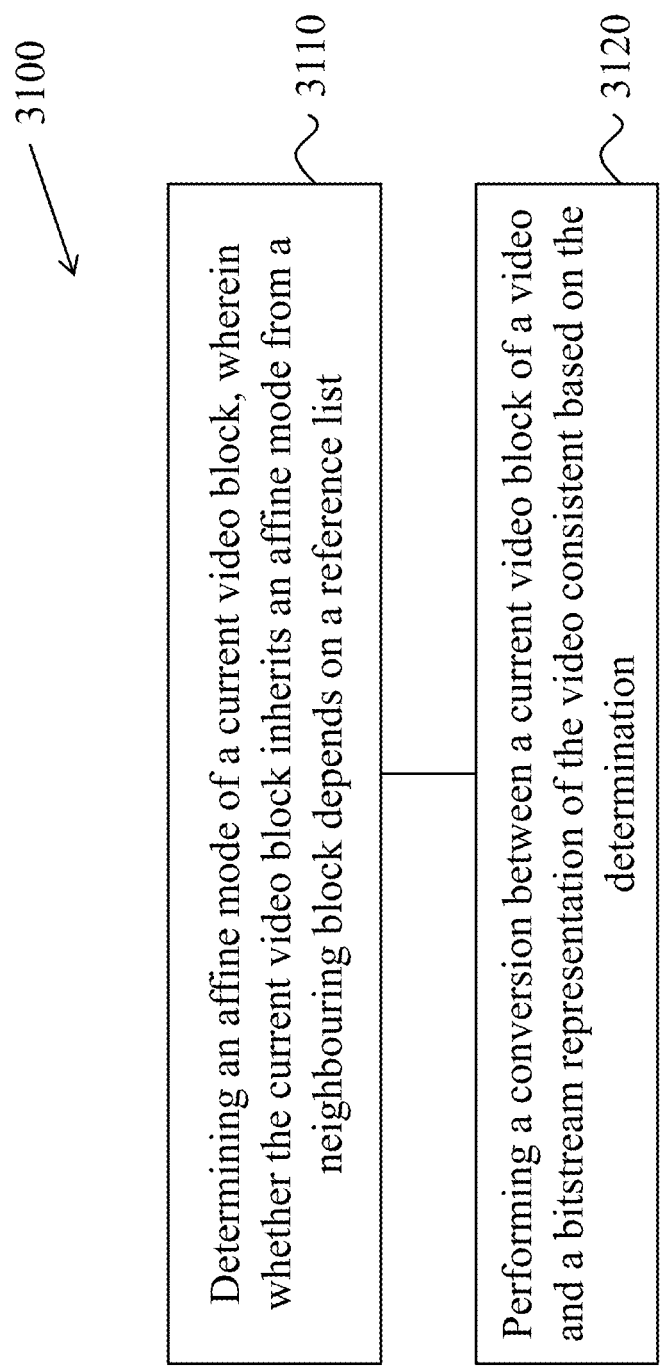
FIG. 31 shows a flowchart of yet another example method for video processing.

FIG. 31 shows a flowchart of yet another exemplary method for video processing. The method 3100 includes, at step 3110, determining an affine mode of a current video block, wherein whether the current video block inherits an affine mode from a neighbouring block depends on a reference list; at step 3120, performing a conversion between a current video block of a video and a bitstream representation of the video consistent based on the determination.

FIG. 32 shows a flowchart of yet another exemplary method for video processing. The method 3200 includes, at step 3210, performing a conversion between a current video block of a video and a bitstream representation of the video consistent, wherein during the conversion an Intra-Block-Copy (IBC) mode and a merge with motion vector difference (MMVD) mode are used, and wherein in the IBC mode, at least one reference picture used by the current video block is a current picture in which the current video block is located in, and in the MMVD mode, a motion vector of a video block is derived based on a merge motion candidate list and is further refined by at least one motion vector difference.

FIG. 33 shows a flowchart of yet another exemplary method for video processing. The method 3300 includes, at step 3310, performing a conversion between a current video block of a video and a bitstream representation of the video, wherein during the conversion an Intra-Block-Copy (IBC) mode and an inter-intra prediction mode are used, and wherein in the IBC mode, at least one reference picture used by the current video block is a current picture in which the current video block is located in, and in the inter-intra prediction mode, prediction signal of the current video block is generated at least based on an intra prediction signal and an inter prediction signal.

Figure 34:
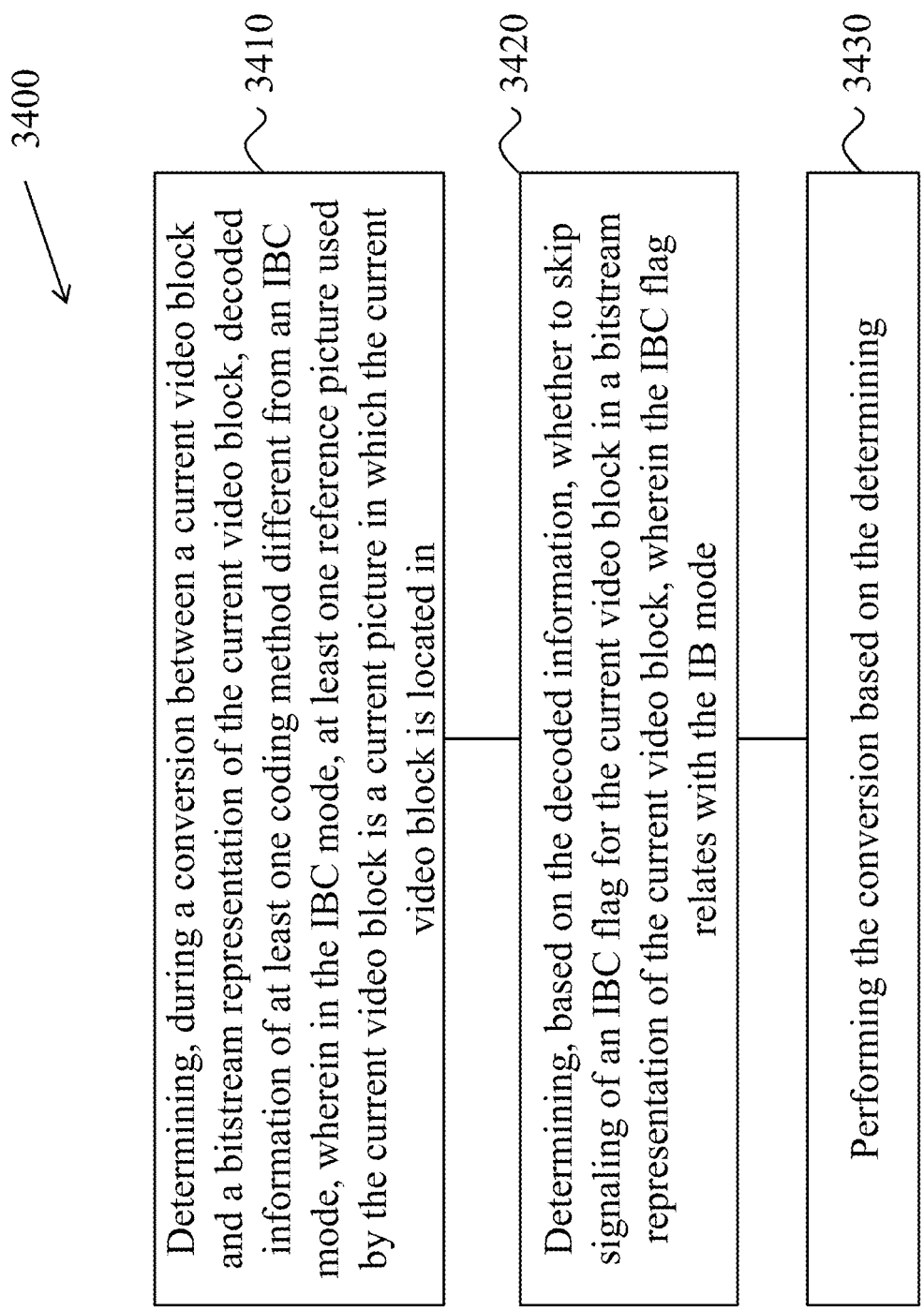
FIG. 34 shows a flowchart of yet another example method for video processing.

FIG. 34 shows a flowchart of yet another exemplary method for video processing. The method 3400 includes, at step 3410, determining, during a conversion between a current video block and a bitstream representation of the current video block, decoded information of at least one coding method different from an IBC mode, wherein in the IBC mode, at least one reference picture used by the current video block is a current picture in which the current video block is located in; at step 3420, determining, based on the decoded information, whether to skip signaling of an IBC flag for the current video block in a bitstream representation of the current video block, wherein the IBC flag relates with the IB mode; and at step 3430, performing the conversion based on the determining.

Figure 35:
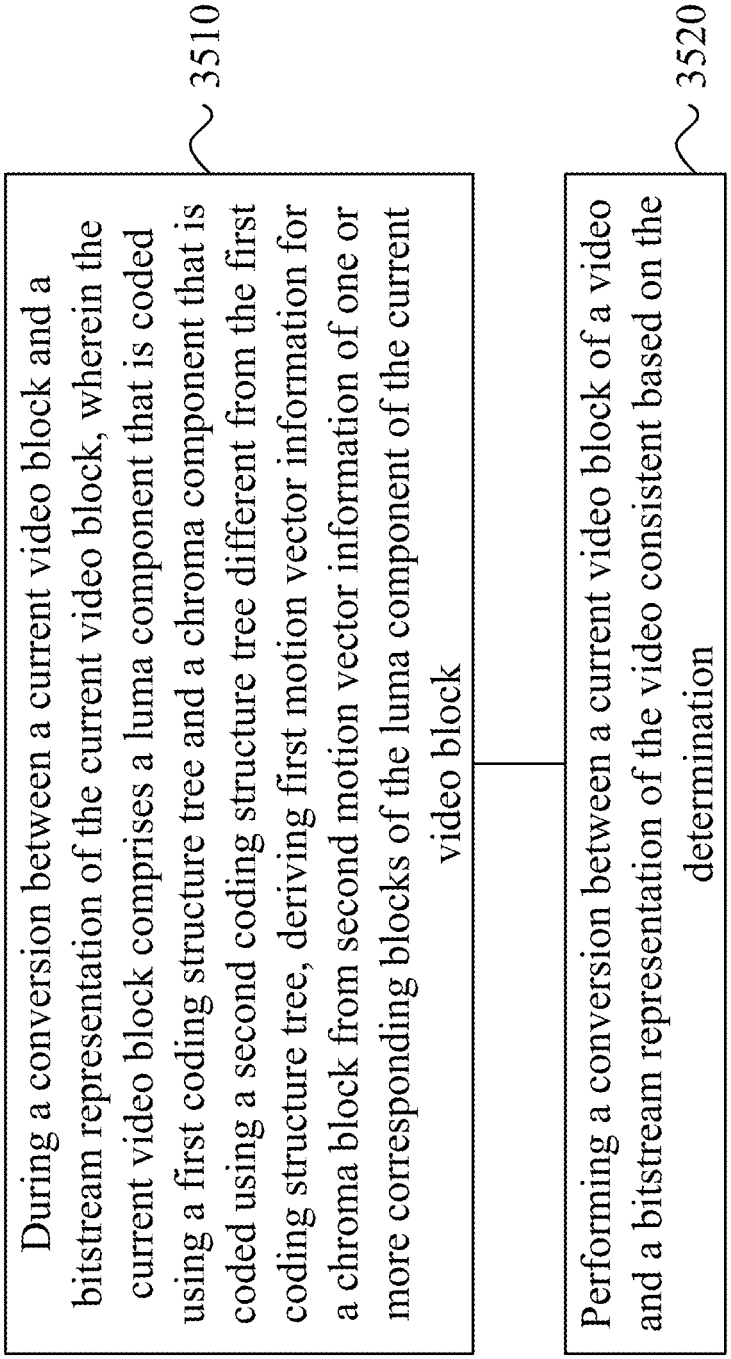
FIG. 35 shows a flowchart of yet another example method for video processing.

FIG. 35 shows a flowchart of yet another exemplary method for video processing. The method 3500 includes, at step 3510, during a conversion between a current video block and a bitstream representation of the current video block, wherein the current video block comprises a luma component that is coded using a first coding structure tree and a chroma component that is coded using a second coding structure tree different from the first coding structure tree, deriving first motion vector information for a chroma block from second motion vector information of one or more corresponding blocks of the luma component of the current video block; at step 3520, performing the conversion based on the first motion vector information and the second vector information.

Figure 36:
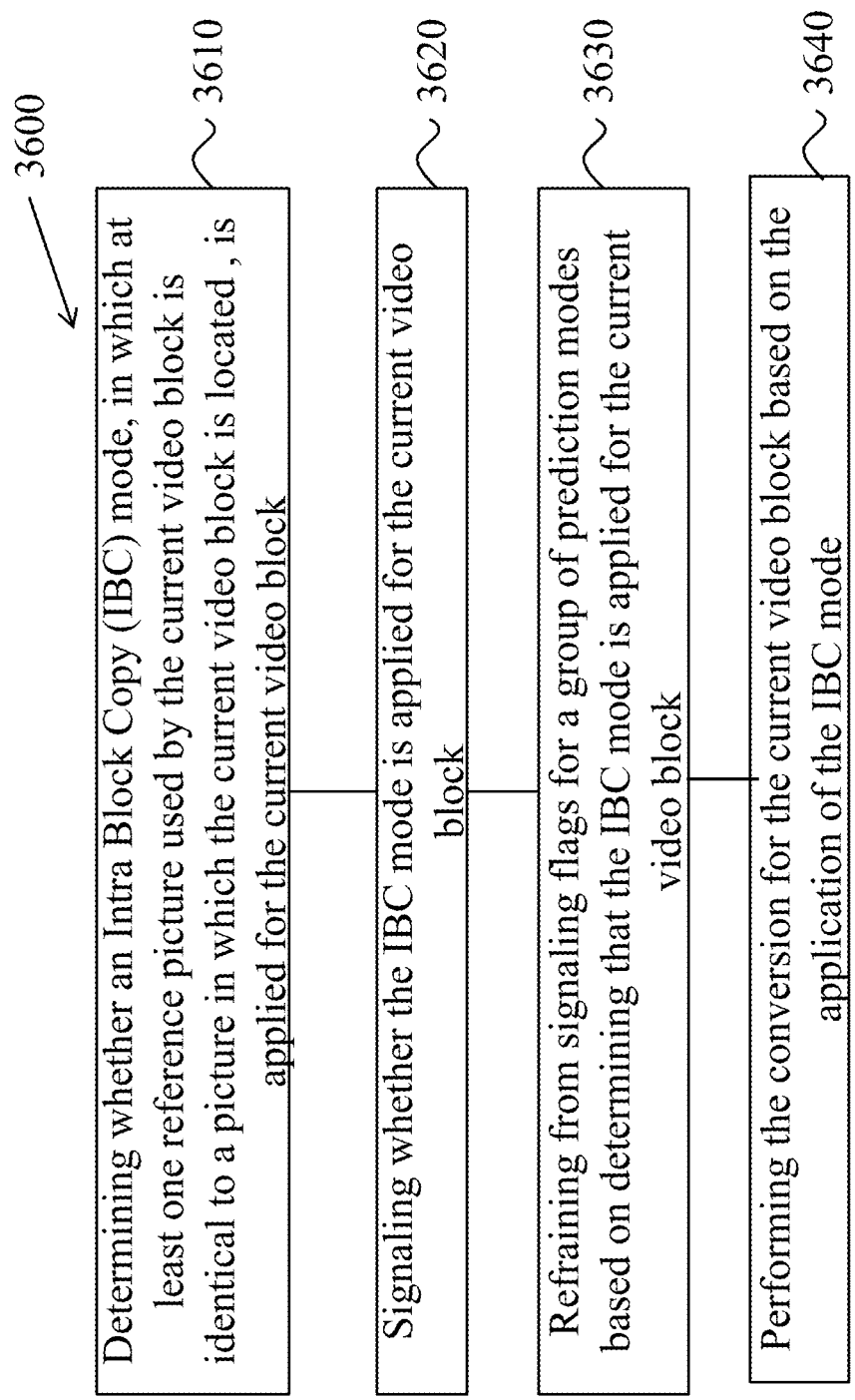
FIG. 36 shows a flowchart of yet another example method for video processing.

FIG. 36 shows a flowchart of yet another exemplary method for video processing. The method 3600 includes, at step 3610, determining whether an Intra Block Copy (IBC) mode, in which at least one reference picture used by the current video block is identical to a picture in which the current video block is located, is applied for the current video block; at step 3620, signaling whether the IBC mode is applied for the current video block; at step 3630, refraining from signaling flags for a group of prediction modes based on determining that the IBC mode is applied for the current video block; and at step 3640, performing the conversion for the current video block based on the application of the IBC mode.

Figure 37:
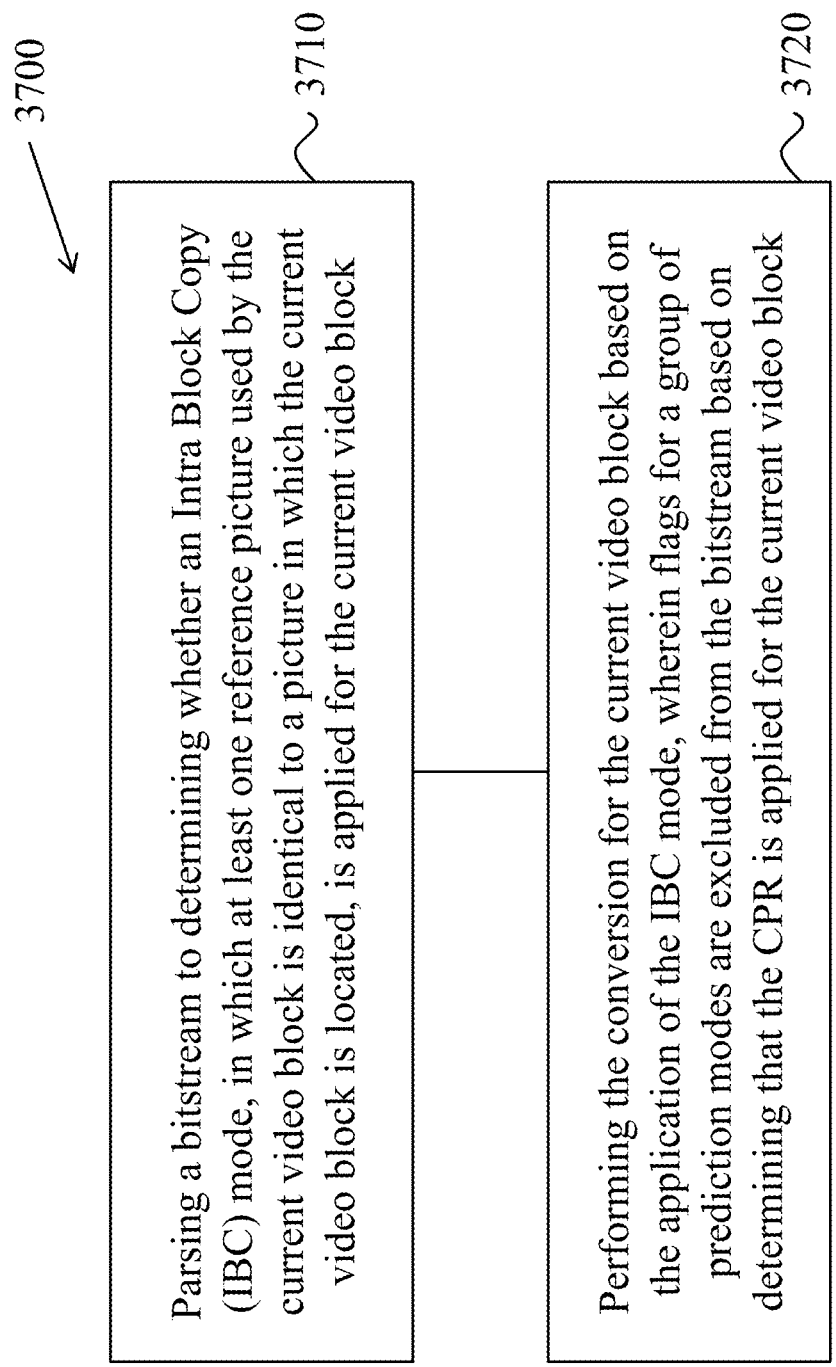
FIG. 37 shows a flowchart of yet another example method for video processing.

FIG. 37 shows a flowchart of yet another exemplary method for video processing. The method 3700 includes, at step 3710, parsing a bitstream to determining whether an Intra Block Copy (IBC) mode, in which at least one reference picture used by the current video block is identical to a picture in which the current video block is located, is applied for the current video block; at step 3720, performing the conversion for the current video block based on the application of the IBC mode, wherein flags for a group of prediction modes are excluded from the bitstream based on determining that the CPR is applied for the current video block.

Figure 38:
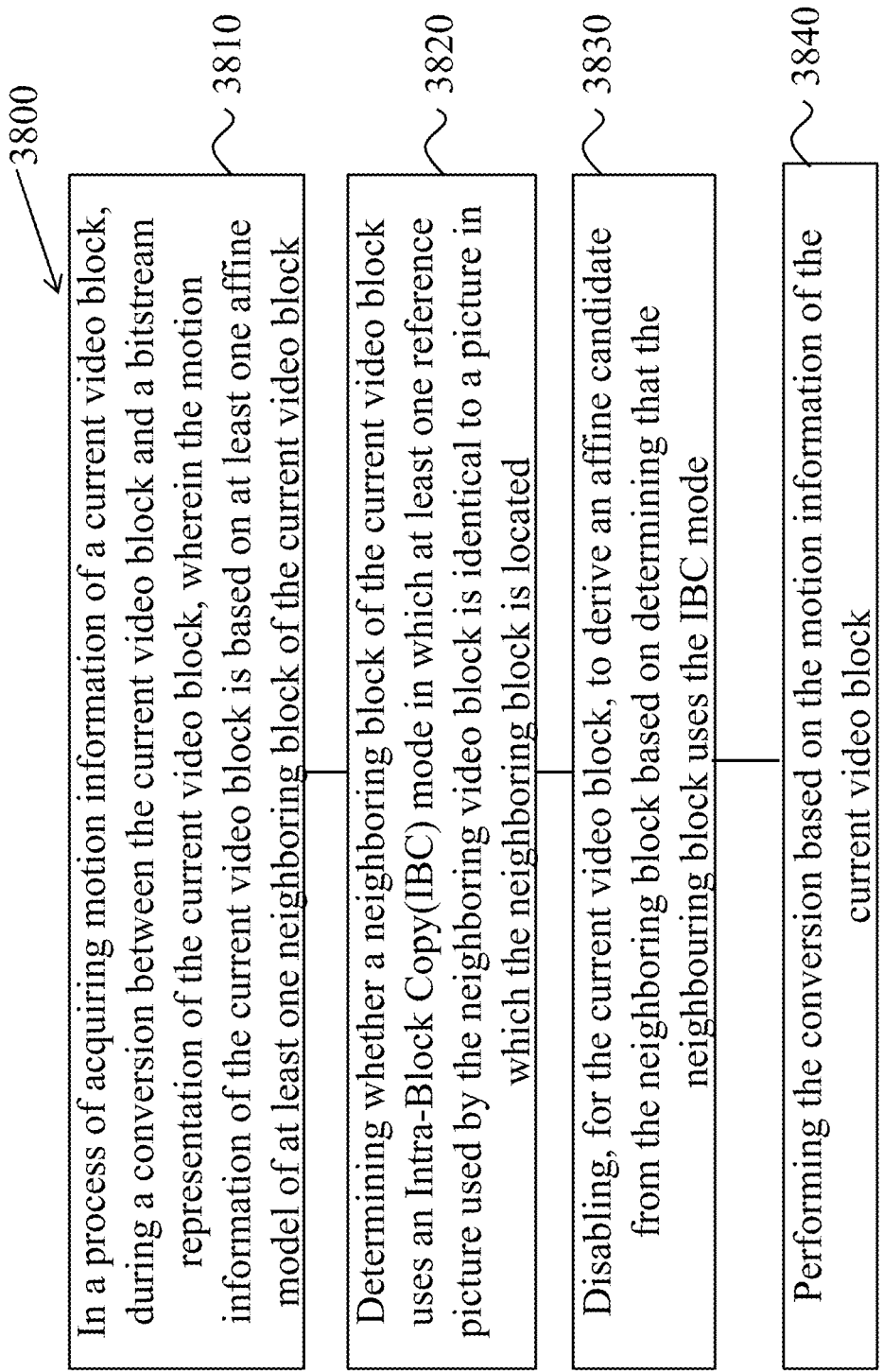
FIG. 38 shows a flowchart of yet another example method for video processing.

FIG. 38 shows a flowchart of yet another exemplary method for video processing. The method 3800 includes, at step 3810, in a process of acquiring motion information of a current video block, during a conversion between the current video block and a bitstream representation of the current video block, wherein the motion information of the current video block is based on at least one affine model of at least one neighboring block of the current video block; at step 3820, determining whether a neighboring block of the current video block uses an Intra-Block Copy (IBC) mode in which at least one reference picture used by the neighboring video block is identical to a picture in which the neighboring block is located; at step 3830, disabling, for the current video block, to derive an affine candidate from the neighboring block based on determining that the neighbouring block uses the IBC mode; and at step 3830, performing the conversion based on the motion information of the current video block.

Figure 39:
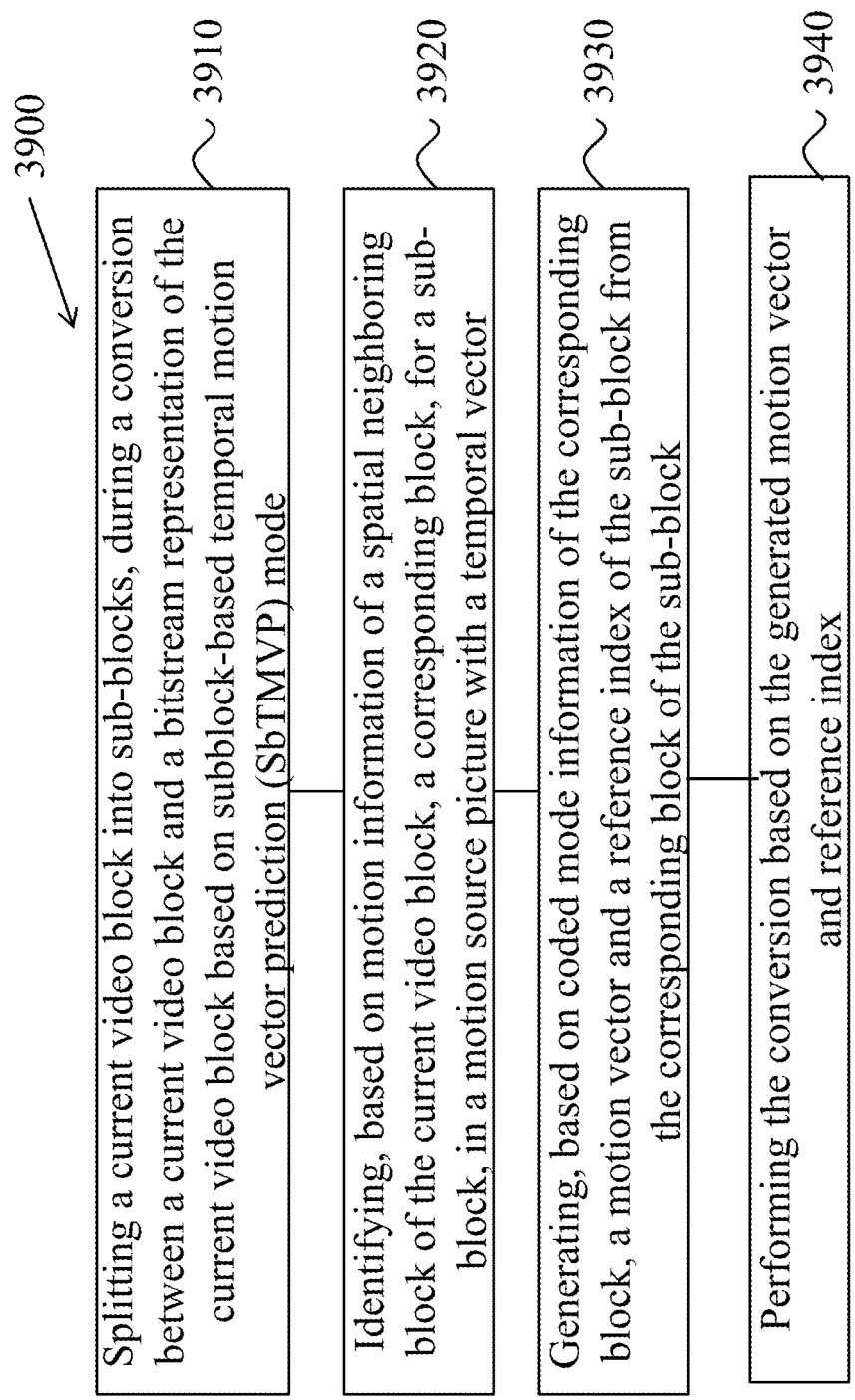
FIG. 39 shows a flowchart of yet another example method for video processing.

FIG. 39 shows a flowchart of yet another exemplary method for video processing. The method 3900 includes, at step 3910, splitting a current video block into sub-blocks, during a conversion between a current video block and a bitstream representation of the current video block based on subblock-based temporal motion vector prediction (SbTMVP) mode; at step 3920, identifying, based on motion information of a spatial neighboring block of the current video block, a corresponding block, for a sub-block, in a motion source picture with a temporal vector; at step 3930, generating, based on coded mode information of the corresponding block, a motion vector and a reference index of the sub-block from the corresponding block of the sub-block; at step 3940, performing the conversion based on the generated motion vector and reference index.

Figure 40:
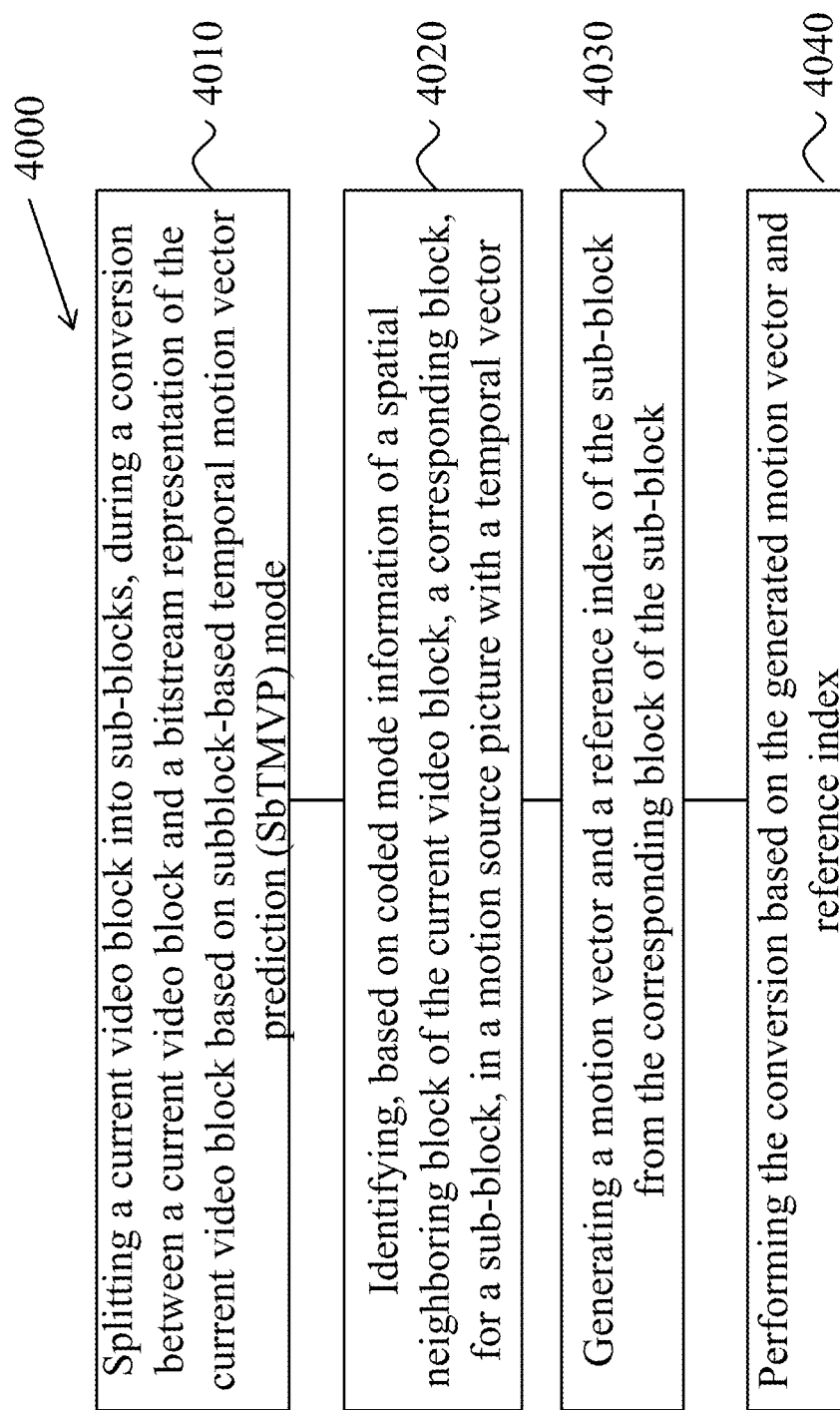
FIG. 40 shows a flowchart of yet another example method for video processing.

FIG. 40 shows a flowchart of yet another exemplary method for video processing. The method 4000 includes, at step 4010, splitting a current video block into sub-blocks, during a conversion between a current video block and a bitstream representation of the current video block based on subblock-based temporal motion vector prediction (SbTMVP) mode; at step 4020, identifying, based on coded mode information of a spatial neighboring block of the current video block, a corresponding block, for a sub-block, in a motion source picture with a temporal vector; at step 4030, generating a motion vector and a reference index of the sub-block from the corresponding block of the sub-block; at step 4040, performing the conversion based on the generated motion vector and reference index.

In some embodiments, the video coding methods may be implemented using an apparatus that is implemented on a hardware platform as described with respect to FIG. 28.

Some embodiments may be described using the following examples.

1.1. A method for video processing, comprising: determining that an Intra-Block-Copy (IBC) mode is applied to a current video block of a video, wherein in the IBC mode, at least one reference picture used by the current video block is a current picture where the current video block is located in; making a decision regarding a disabling of a specific coding mode for the current block; performing, based on the decision, a conversion between the current video block and the bitstream representation; wherein the specific coding mode uses a motion vector and a non-current picture to derive a prediction of a video block.

1.2. The method of example 1.1, wherein the conversion comprises encoding the current video block into the bitstream representation.

1.3. The method of example 1.1, wherein the conversion comprises decoding the bitstream representation of the current video block to generate pixel values of the current video block.

1.4. The method of any of examples 1-3, wherein the specific coding mode comprises an affine motion compensation mode, wherein the affine motion compensation mode uses at least one control point motion vector.

1.5. The method of example 1.4, wherein reference picture indices is signaled, and the signaling of an affine flag is skipped in response to the current video block using the IBC mode.

1.6. The method of example 1.4, the method further comprises: before the affine flag is signaled, signaling reference picture indices and determining whether bi-prediction mode is used for the current video block, wherein if bi-prediction mode is used for the current video block and only one reference picture is the current reference picture, then the affine flag is signaled; and if bi-prediction mode is used for the current video block and both reference pictures are the current reference picture, then the affine flag is not signaled.

1.7. The method of example 1.6, wherein integer precision is used for motion vectors of the current video block.

1.8. The method of any of examples 1.1-1.7, wherein the specific coding mode comprises a GBi mode, wherein in the GBI mode, different weighting values relates with different reference pictures.

1.9. The method of example 1.8, wherein a GBi weighting index is not signaled in response to the IBC mode being used in the current block.

1.10 The method of example 1.8, wherein the GBi weighting index is inferred to be 0.

1.11. The method of any of examples 1.1-1.10, wherein the specific coding mode comprises a merge with motion vector difference (MMVD) mode, wherein in the MMVD mode, a motion vector of a video block is derived based on a merge motion candidate list and is further refined by at least one motion vector difference.

1.12. The method of example 1.11, wherein an MMVD flag is not signaled in response to the IBC mode being used in the current video block.

1.13. The method of example 1.12, wherein the MMVD flag is inferred to be zero.

1.14. The method of any of examples 1.1-1.13, the specific coding mode comprises a combined inter-intra prediction (CIIP) mode, wherein in the CIIP mode, a prediction signal of the current video block is generated at least based on an intra prediction signal and an inter prediction signal.

1.15. The method of example 1.14, wherein a CIIP flag for the current video block is not signaled in response to the IBC mode being used in the current block.

1.16. The method of example 1.15, wherein the CIIP flag is inferred to be zero.

1.17. A method for video processing, comprising: determining that a current video block is coded using a specific coding mode; making a decision regarding disabling of an Intra-Block-Copy (IBC) mode for the current block based on the determination, wherein in the IBC mode, at least one reference picture used by the current video block is a current picture where the current block is located in; performing, based on the decision, a conversion between the current block and the bitstream representation; wherein the specific coding mode uses a motion vector and a non-current picture to derive a prediction of the current block.

1.18. The method of example 1.17, wherein the conversion comprises encoding the current video block into the bitstream representation.

1.19. The method of example 1.17, wherein the conversion comprises decoding the bitstream representation of the current video block to generate pixel values of the current video block.

1.20. The method of any one of examples 1.1-1.3, wherein the specific coding mode comprises an affine motion compensation mode, wherein the affine motion compensation uses at least one control point motion vector.

1.21. The method of example 1.20, wherein an affine flag in block level is signaled in the bitstream indicating whether the affine motion compensation mode is enabled or not for the current video block, and if the affine flag indicates that the affine motion compensation mode is enabled for the current video block, then it is not signaled whether the IBC mode is applied.

1.22. The method of any one of examples 1.17-1.19, wherein the specific coding mode comprises a GBi mode, wherein in the GBI mode, different weighting values relates with different reference pictures.

1.23. The method of example 1.22, wherein an IBC indication is not signaled in response to the GBI mode being applied.

1.24. The method of example 1.23, wherein the IBC indication is inferred to be 0.

1.25. The method of any one of examples 1.17-1.24, wherein the specific coding mode comprises a merge with motion vector difference (MMVD) mode, wherein in the MMVD mode, a motion vector of the current block is derived based on a merge motion candidate list and is further refined by at least one motion vector difference.

1.26. The method of example 1.25, wherein an IBC indication is not signaled in response to the MMVD mode being applied in the current video block.

1.27. The method of example 1.26, wherein the IBC indication is inferred to be zero.

1.28. The method of any of examples 1.17-1.27, the specific coding mode comprises a combined inter-intra prediction (CIIP) mode, wherein in the CIIP mode, a prediction signal of the current video block is generated at least based on an intra prediction signal and an inter prediction signal.

1.29. The method of example 1.28, wherein an IBC flag for the current video block is not signaled in response to the inter-intra prediction mode being applied.

1.30. The method of example 1.29, wherein the IBC flag is inferred to be zero.

1.31. A method for video processing, comprising: determining an affine mode of a current video block, wherein whether the current video block inherits an affine mode from a neighbouring block depends on a reference list; performing a conversion between a current video block of a video and a bitstream representation of the video consistent based on the determination.

1.32 The method of example 1.31, wherein the neighbouring block applies bi-prediction, a reference picture in a reference list X is the current picture and a reference picture in a reference list (1−X) is not the current picture, wherein X is 0 or 1.

1.33. The method of example 1.32, wherein motion information of the neighbouring block referring to the reference list X is not used to derive an affine merge candidate in a sub-block merge candidate list.

1.34. The method of example 1.32 or 1.33, wherein motion information of the neighbouring block referring to the reference list (1−X) is used to derive the affine merge candidate in the sub-block merge candidate list.

1.35. The method of example 1.32, wherein motion information of the neighbouring block referring to the reference list X is not used to derive an affine AMVP candidate in an affine AMVP list.

1.36. The method of example 1.35, wherein the motion information of the neighbouring block referring to the reference list X is not used to derive the affine AMVP candidate in the affine AMVP list for the reference list X.

1.37. The method of example 1.32, wherein motion information of the neighbouring block referring to the reference list (1−X) is used to derive an affine AMVP candidate in an affine AMVP list.

1.38. The method of example 1.37, wherein the motion information of the neighbouring block referring to the reference list (1−X) is used to derive the affine AMVP candidate in the affine AMVP list for the reference list (1−X).

1.39. A method for video processing, comprising: performing a conversion between a current video block of a video and a bitstream representation of the video consistent; wherein during the conversion an Intra-Block-Copy (IBC) mode and a merge with motion vector difference (MMVD) mode are used, wherein in the IBC mode, at least one reference picture used by the current video block is a current picture in which the current video block is located in, and in the MMVD mode, a motion vector of a video block is derived based on a merge motion candidate list and is further refined by at least one motion vector difference.

1.40. The method of example 1.39, wherein, the MMVD mode uses a base MV candidate which has at least one reference picture referring to the current picture.

1.41. The method of example 1.40, wherein the MMVD is based on at least one MV referring to the current picture, and an MV not referring to the current picture is omitted if existing.

1.42. The method of example 1.41, wherein distances signaled by the MMVD are integers.

1.43. The method of example 1.41, wherein the MMVD is uni-predicted.

1.44. The method of example 1.39, wherein if the MMVD mode uses a base MV candidate which has at least one reference pictures not referring to the current picture, the MMVD is based on at least one MV referring not to the current picture, and an MV referring to the current picture is omitted if existing.

1.45. A method for video processing, comprising: performing a conversion between a current video block of a video and a bitstream representation of the video; wherein during the conversion an Intra-Block-Copy (IBC) mode and an inter-intra prediction mode are used, wherein in the IBC mode, at least one reference picture used by the current video block is a current picture in which the current video block is located in, and in the inter-intra prediction mode, prediction signal of the current video block is generated at least based on an intra prediction signal and an inter prediction signal.

1.46. The method of example 1.45, wherein a merge candidate to be inter-intra predicted has at least one reference picture referring to the current picture.

1.47. The method of example 1.46, wherein the inter-intra prediction is based on at least one MV referring to the current picture, and an MV not referring to the current picture is omitted if existing.

1.48. The method of example 1.45, wherein an intra-prediction part of the inter-intra prediction mode excludes boundary filtering.

1.49. The method of example 1.45, wherein an intra-prediction part of the inter-intra prediction mode excludes position dependent prediction combination (PDPC).

1.50. The method of example 1.45, wherein an intra-prediction part of the inter-intra prediction mode comprises at least one of: most probable mode selection (MPMs), a DC prediction mode, a horizontal prediction mode or a vertical prediction mode.

1.51. The method of example 1.45, wherein an inter-prediction part of the inter-intra prediction mode is uni-predicted.

1.52. The method of any of examples 1.45-1.51, wherein if a merge candidate to be inter-intra predicted has at least one reference pictures not referring to the current picture, the inter-intra prediction based on at least one MV referring not to the current picture is performed and the MV referring to the current picture is omitted if existing.

1.53. A method for video processing, comprising: determining, during a conversion between a current video block and a bitstream representation of the current video block, decoded information of at least one coding method different from an IBC mode, wherein in the IBC mode, at least one reference picture used by the current video block is a current picture in which the current video block is located in; determining, based on the decoded information, whether to skip signaling of an IBC flag for the current video block in a bitstream representation of the current video block, wherein the IBC flag relates with the IB mode; and performing the conversion based on the determining.

1.54. The method of example 1.53, wherein the conversion comprises encoding the current video block into the bitstream representation.

1.55. The method of example 1.53, wherein the conversion comprises decoding the bitstream representation of the current video block current video block to generate pixel values of the current video block.

1.56. The method of any of examples 1.53-1.55, further comprising: if it is determined not to skip signaling of the IBC flag in the determining step, signaling the IBC flag for the current video block in the bitstream representation; otherwise, refraining from signaling the IBC flag for the current video block in the bitstream representation.

1.57. The method of any of examples 1.53-1.56, wherein it is determined to skip signaling of the IBC flag when the decoded information of coding method comprises at least one of an affine flag, an inter-intra prediction flag, a generalized bi-prediction prediction (GBi) index, a merge with motion vector differences (MMVD) information, an alternative temporal motion vector prediction (ATMVP) information.

1.58. A method for video processing, comprising: during a conversion between a current video block and a bitstream representation of the current video block, wherein the current video block comprises a luma component that is coded using a first coding structure tree and a chroma component that is coded using a second coding structure tree different from the first coding structure tree, deriving first motion vector information for a chroma block from second motion vector information of one or more corresponding blocks of the luma component of the current video block; performing the conversion based on the first motion vector information and the second vector information.

1.59. The method of example 1.58, wherein the conversion comprises encoding the current video block into the bitstream representation.

1.60. The method of example 1.58, wherein the conversion comprises decoding the bitstream representation of the current video block current video block to generate pixel values of the current video block.

1.61. The method of example 1.58, wherein the first motion vector information is used as a MV predication or a merge candidate to derive the second motion vector information.

1.62. The method of and of examples 1.58-1.61, wherein the one or more corresponding blocks of the luma component are in a top-left position, a top-right position, a bottom-left position, a bottom-right position and/or a center position of the current video block.

1.63. The method of example 1.62, further comprising: determining whether a color format of the chroma component is different from a 4:4:4 color format; and scaling, upon determining that the color format of the chroma component is different from a 4:4:4 color format, the current video block to determine the one or more corresponding blocks of the luma component.

1.64. The method of any of examples 1.58-1.60, wherein the current video block is coded using an Intra-Block-Copy (IBC) mode.

1.65. The method of example 1.64, wherein a first set of restrictions on a height and a width of the current video block is different from a second set of restrictions on a height and a width of an intra-coded video block different from the current video block.

1.66. The method of example 1.65, wherein the width of the current video block is greater than 2 and the height is greater than 2 when the current video block is coded using an intra block copy mode, and the width of the current video block is greater or equal to 2 and the height is greater or equal to 2 when the current video block is coded using the IBC mode.

1.67. An apparatus in a video system comprising a processor and a non-transitory memory with instructions thereon, wherein the instructions upon execution by the processor, cause the processor to implement the method in any one of examples 1.1 to 1.66.

1.68. A computer program product stored on a non-transitory computer readable media, the computer program product including program code for carrying out the method in any one of examples 1.1 to 1.66.

2.1. A method for video processing, comprising: determining whether an Intra Block Copy (IBC) mode, in which at least one reference picture used by the current video block is identical to a picture in which the current video block is located, is applied for the current video block; signaling whether the IBC mode is applied for the current video block; refraining from signaling flags for a group of prediction modes based on determining that the IBC mode is applied for the current video block; and performing the conversion for the current video block based on the application of the IBC mode.

2.2. The method of example 2.1, wherein the conversion comprises encoding the current video block into the bitstream representation.

2.3. The method of example 2.1 or 2.2, wherein the group of prediction modes include an affine mode, wherein the affine mode uses at least one control point motion vector.

2.4. The method of example 2.3, wherein the determining whether the IBC mode is applied for the current video block takes place before an affine flag is signaled; and the method further comprises: if it is determined that the IBC mode is applied for the current video block, then refraining from signaling the affine flag; and otherwise, signaling the affine flag.

2.5. The method of example 2.4, wherein when the affine flag is not signaled, the affine flag is inferred to be zero.

2.6. The method of any of examples 2.1-2.5, wherein, the group of prediction modes include a generalized bi-prediction (GBi) mode, wherein in the GBi mode, different weighting values relates with different reference pictures.

2.7. The method of example 2.6, wherein the determining whether the IBC mode is applied for the current video block takes place before a GBi index is signaled; and the method further comprises: if it is determined that the IBC mode is applied for the current video block, then refraining from signaling GBi weighting index, and otherwise, signaling the GBi weighting index.

2.8. The method of example 2.7, wherein when the GBi weighting index is not signaled, the weighting values of the reference pictures used by the GBi are inferred to be zero.

2.9. A method for video processing, comprising: parsing a bitstream to determining whether an Intra Block Copy (IBC) mode, in which at least one reference picture used by the current video block is identical to a picture in which the current video block is located, is applied for the current video block; performing the conversion for the current video block based on the application of the IBC mode, wherein flags for a group of prediction modes are excluded from the bitstream based on determining that the CPR is applied for the current video block.

2.10. The method of example 2.9, wherein the conversion comprises decoding the bitstream representation of the current video block current video block to generate pixel values of the current video block.

2.11. The method of example 2.9 or 2.10, wherein the flag for the prediction mode is inferred to be zero.

2.12. The method of any of examples 2.9-2.11, wherein the group of prediction modes include at least one of: an affine mode in which at least one control point motion vector is used, an inter-intra prediction mode in which a prediction signal of the current video block is generated at least based on an intra prediction signal and an inter prediction signal, a generalized bi-prediction prediction (GBi) mode with unequal weights, a merge with motion vector differences (MMVD) mode in which a motion vector of a video block is derived based on a merge motion candidate list and is further refined by at least one motion vector difference, and an alternative temporal motion vector prediction (ATMVP) mode in which motion information of a subblock of the current video block is based on a corresponding block that is determined by motion information of a spatial neighboring block of the current video block.

2.13. An apparatus in a video system comprising a processor and a non-transitory memory with instructions thereon, wherein the instructions upon execution by the processor, cause the processor to implement the method in any one of examples 2.1 to 2.12.

2.14. A computer program product stored on a non-transitory computer readable media, the computer program product including program code for carrying out the method in any one of examples 2.1 to 2.12.

2.15. A video decoding apparatus comprising a processor configured to implement a method recited in one or more of examples 2.1 to 2.12.

2.16. A video encoding apparatus comprising a processor configured to implement a method recited in one or more of examples 2.1 to 2.12.

3.1. A method for video processing, comprising: in a process of acquiring motion information of a current video block, during a conversion between the current video block and a bitstream representation of the current video block, wherein the motion information of the current video block is based on at least one affine model of at least one neighboring block of the current video block, determining whether a neighboring block of the current video block uses an Intra-Block Copy (IBC) mode in which at least one reference picture used by the neighboring video block is identical to a picture in which the neighboring block is located; disabling, for the current video block, to derive an affine candidate from the neighboring block based on determining that the neighbouring block uses the IBC mode; and performing the conversion based on the motion information of the current video block.

3.2. The method of example 3.1, wherein the conversion comprises encoding the current video block into the bitstream representation.

3.3. The method of example 3.1, wherein the conversion comprises decoding the bitstream representation of the current video block to generate pixel values of the current video block.

3.4. The method of any of examples 3.1-3.3, wherein the method further comprising: deriving, based on determining that the neighbouring block does not use the IBC mode, an affine candidate for the current video block from the neighbouring block.

3.5. The method of any of examples 3.1-3.4, wherein the affine candidate comprises an affine merge candidate, and wherein the affine candidate is in a sub-block merge candidate list 3.6. The method of example 3.5, wherein the neighbouring block is treated as unavailable based on determining that the neighbouring block uses the IBC mode.

3.7. The method of any of examples 3.1-3.4, wherein the affine candidate comprises an affine Advanced Motion Vector Prediction (AMVP) candidate, and wherein the affine candidate is in an affine AMVP list.

3.8. The method of example 3.7, wherein the neighbouring block is treated as unavailable based on determining that the neighbouring block uses the IBC mode.

3.9. An apparatus in a video system comprising a processor and a non-transitory memory with instructions thereon, wherein the instructions upon execution by the processor, cause the processor to implement the method in any one of examples 3.1 to 3.8.

3.10. A computer program product stored on a non-transitory computer readable media, the computer program product including program code for carrying out the method in any one of examples 3.1 to 3.8.

3.11. A video decoding apparatus comprising a processor configured to implement a method recited in one or more of examples 3.1 to 3.8.

3.12. A video encoding apparatus comprising a processor configured to implement a method recited in one or more of examples 3.1 to 3.8.

4.1. A method for video processing, comprising: splitting a current video block into sub-blocks, during a conversion between a current video block and a bitstream representation of the current video block based on subblock-based temporal motion vector prediction (SbTMVP) mode; identifying, based on motion information of a spatial neighboring block of the current video block, a corresponding block, for a sub-block, in a motion source picture with a temporal vector; generating, based on coded mode information of the corresponding block, a motion vector and a reference index of the sub-block from the corresponding block of the sub-block; performing the conversion based on the generated motion vector and reference index.

4.2. The method of example 4.1, wherein the motion source picture is a collocated reference picture of the current video block.

4.3. The method of any of examples 4.1-4.2, wherein the corresponding block is coded with an Intra Block Copy (IBC) mode, in which a reference block of the corresponding block includes at least one pixel in a picture that includes the corresponding block.

4.4. The method of example 4.3, further comprising: treating the corresponding block as unavailable during the conversion.

4.5. The method of example 4.4, further comprising: refraining from deriving the motion vector and the reference picture of the sub-block from the corresponding block.

4.6. The method of example 4.5, further comprising: assigning default motion information to the current video block.

4.7. The method of example 4.3, wherein the corresponding block is treated as available and the motion vector and the reference picture of the sub-block is derived from the corresponding block.

4.8. The method of example 4.7, wherein the motion vector of the sub-block is copied from that associated with the corresponding block.

4.9. The method of example 4.1, wherein the spatial neighboring block is treated as unavailable if it uses an IBC mode, in which a reference block of the spatial neighboring block includes at least one pixel in a picture that includes the spatial block.

4.10. A method for video processing, comprising: splitting a current video block into sub-blocks, during a conversion between a current video block and a bitstream representation of the current video block based on subblock-based temporal motion vector prediction (SbTMVP) mode; identifying, based on coded mode information of a spatial neighboring block of the current video block, a corresponding block, for a sub-block, in a motion source picture with a temporal vector; generating a motion vector and a reference index of the sub-block from the corresponding block of the sub-block; performing the conversion based on the generated motion vector and reference index.

4.11. The method of example 4.10, wherein the motion source picture is a collocated reference picture of the current video block.

4.12. The method of any of examples 4.10-4.11, wherein the spatial neighboring block is coded with an Inra Block Copy (IBC) mode, in which a reference block of the spatial neighboring block includes at least one pixel in a picture that includes the spatial neighboring block.

4.13. The method of example 4.12, further comprising: treating the spatial neighboring block as unavailable during the conversion.

4.14. The method of example 4.13, further comprising: refraining from identifying the corresponding block based on a motion vector of the spatial neighboring block.

4.15. The method of example 4.14, further comprising: default motion information is assigned to identify the corresponding block.

4.16. The method of any examples of 4.1 to 4.15, wherein the conversion comprises encoding the current video block into the bitstream representation.

4.17. The method of any examples of 4.1 to 4.15, wherein the conversion comprises decoding the bitstream representation of the current video block to generate pixel values of the current video block.

4.18. An apparatus in a video system comprising a processor and a non-transitory memory with instructions thereon, wherein the instructions upon execution by the processor, cause the processor to implement the method in any one of examples 4.1 to 4.15.

4.19. A computer program product stored on a non-transitory computer readable media, the computer program product including program code for carrying out the method in any one of examples 4.1 to 4.15.

4.20. A video decoding apparatus comprising a processor configured to implement a method recited in one or more of examples 4.1 to 4.15.

4.21. A video encoding apparatus comprising a processor configured to implement a method recited in one or more of examples 4.1 to 4.15.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for coding video data, comprising:
   determining that an intra block copy (IBC) mode is applied to a current video block of a video, wherein in the IBC mode, reference samples from a video region including the current video block are used;
   making a decision regarding a disabling of a combined inter-intra prediction mode for the current video block, wherein in the combined inter-intra prediction mode, a final prediction is generated at least based on a weighted sum of an intermediate intra prediction signal and an intermediate inter prediction signal; and
   performing, based on the decision, a conversion between the current video block and a bitstream of the video,
   wherein a combined inter-intra prediction flag for the current video block is not included in the bitstream in response to the IBC mode being used in the current video block.

2. The method of claim 1, wherein when the combined inter-intra prediction flag is not included in the bitstream, the combined inter-intra prediction flag is inferred to be zero.

3. The method of claim 1, further comprising:
   making a decision regarding a disabling of a specific coding mode for the current video block.

4. The method of claim 3, wherein a flag for the specific coding mode is not included in the bitstream in response to the IBC mode being used in the current video block.

5. The method of claim 4, wherein when the flag is not included in the bitstream, the flag is inferred to be zero.

6. The method of claim 3, wherein the specific coding mode comprises a bi-prediction with CU-level weights mode, wherein in the bi-prediction with CU-level weights mode, different weighting values relate with different reference pictures in a prediction derivation process.

7. The method of claim 6, wherein a weighting index of the bi-prediction with CU-level weights mode is not included in the bitstream in response to the IBC mode being used in the current video block.

8. The method of claim 7, wherein when the weighting index is not included in the bitstream, the weighting index is inferred to be 0.

9. The method of claim 3, wherein the specific coding mode comprises a merge with motion vector difference (MMVD) mode, wherein in the MMVD mode, a motion vector of a video block is derived based on a merge motion candidate list and is further refined by at least one motion vector offset.

10. The method of claim 3, wherein the specific coding mode comprises an affine mode, wherein the affine mode uses at least one control point motion vector.

11. The method of claim 3, wherein the specific coding mode comprises a sub-block based temporal motion vector prediction mode, wherein in the sub-block based temporal motion vector prediction mode, motion information is derived based on a collocated region that is determined by at least one temporal motion offset.

12. The method of claim 1, wherein before the performing, the method further comprises:
   deriving a block vector for the current video block; and
   using at least one block vector difference included in the bitstream to refine the block vector.

13. The method of claim 1, wherein the IBC mode is applied to a video block with a dual coding tree in which a luma component and chroma components are coded with separated coding structure trees.

14. The method of claim 1, wherein a width of the current video block is greater or equal to 2 and a height is greater or equal to 2.

15. The method of claim 1, wherein the conversion comprises decoding the current video block from the bitstream.

16. The method of claim 1, wherein the conversion comprises encoding the current video block into the bitstream.

17. An apparatus for processing video data comprising a processor and a non-transitory memory with instructions thereon, wherein the instructions upon execution by the processor, cause the processor to:
   determine that an intra block copy (IBC) mode is applied to a current video block of a video, wherein in the IBC mode, reference samples from a video region including the current video block are used;
   make a decision regarding a disabling of a combined inter-intra prediction mode for the current video block, wherein in the combined inter-intra prediction mode, a final prediction is generated at least based on a weighted sum of an intermediate intra prediction signal and an intermediate inter prediction signal; and
   perform, based on the decision, a conversion between the current video block and a bitstream of the video,
   wherein a combined inter-intra prediction flag for the current video block is not included in the bitstream in response to the IBC mode being used in the current video block.

18. A non-transitory computer-readable recording medium storing a bitstream of a video which is generated by a method performed by a video processing apparatus, wherein the method comprises:
   determining that an intra block copy (IBC) mode is applied to a current video block of a video, wherein in the IBC mode, reference samples from a video region including the current video block are used;
   making a decision regarding a disabling of a combined inter-intra prediction mode for the current video block, wherein in the combined inter-intra prediction mode, a final prediction is generated at least based on a weighted sum of an intermediate intra prediction signal and an intermediate inter prediction signal; and
   generating the bitstream from the current video block based on the decision,
   wherein a combined inter-intra prediction flag for the current video block is not included in the bitstream in response to the IBC mode being used in the current video block.

19. A non-transitory computer-readable storage medium storing instructions that cause a processor to:
   determine that an intra block copy (IBC) mode is applied to a current video block of a video, wherein in the IBC mode, reference samples from a video region including the current video block are used;
   make a decision regarding a disabling of a combined inter-intra prediction mode for the current video block, wherein in the combined inter-intra prediction mode, a final prediction is generated at least based on a weighted sum of an intermediate intra prediction signal and an intermediate inter prediction signal; and
   perform, based on the decision, a conversion between the current video block and a bitstream of the video,
   wherein a combined inter-intra prediction flag for the current video block is not included in the bitstream in response to the IBC mode being used in the current video block.

\* \* \* \* \*